(12) United States Patent
Heng et al.

(10) Patent No.: US 10,275,593 B2
(45) Date of Patent: Apr. 30, 2019

(54) SECURE COMPUTING DEVICE USING DIFFERENT CENTRAL PROCESSING RESOURCES

(71) Applicant: UNIQUESOFT, LLC, Palatine, IL (US)

(72) Inventors: Terrence Ming Swee Heng, Arlington Heights, IL (US); Walter Lee Davis, Rogersville, MO (US)

(73) Assignee: UNIQUESOFT, LLC, Palatine, IL (US)

( * ) Notice: Subject to any disclaimer, the term of this patent is extended or adjusted under 35 U.S.C. 154(b) by 0 days.

(21) Appl. No.: 13/854,320

(22) Filed: Apr. 1, 2013

(65) Prior Publication Data

US 2014/0298454 A1 Oct. 2, 2014

(51) Int. Cl.
*G06F 21/52* (2013.01)
*G06F 21/55* (2013.01)
*G06F 21/00* (2013.01)

(52) U.S. Cl.
CPC .................... *G06F 21/55* (2013.01)

(58) Field of Classification Search
CPC ....................................... G06F 21/55
USPC .............................. 726/17, 22, 24
See application file for complete search history.

(56) References Cited

U.S. PATENT DOCUMENTS

| 6,178,503 B1 | 1/2001 | Madden et al. | |
|---|---|---|---|
| 7,356,677 B1 | 4/2008 | Rafizadeh | |
| 7,689,998 B1 * | 3/2010 | Chrysanthakopoulos | G06F 9/4881 718/100 |
| 7,950,020 B2 * | 5/2011 | Sun et al. | 719/319 |
| 7,952,999 B1 * | 5/2011 | Jiang et al. | 370/229 |
| 8,893,267 B1 * | 11/2014 | Sathe et al. | 726/21 |
| 2007/0220601 A1 * | 9/2007 | Huelsbergen et al. | 726/22 |
| 2008/0022094 A1 * | 1/2008 | Gupta | H04L 63/0485 713/165 |
| 2008/0028464 A1 * | 1/2008 | Bringle | G06F 21/33 726/22 |
| 2008/0215852 A1 * | 9/2008 | Largman et al. | 712/28 |
| 2008/0244227 A1 * | 10/2008 | Gee et al. | 712/30 |
| 2009/0126006 A1 * | 5/2009 | Zhang et al. | 726/17 |
| 2009/0307698 A1 * | 12/2009 | Khatri | G06F 1/3203 718/102 |

(Continued)

*Primary Examiner* — Haresh N Patel
(74) *Attorney, Agent, or Firm* — Garlick & Markison; Kelly H. Hale

(57) ABSTRACT

A computing device includes central processing resources, memory, a network interface, and a security control module. The security control module determines when to change operation of a program of the computing device. When the operation of the program is to be changed, the security control module identifies a first processing resource of the central processing resources that is currently assigned to execute the program and selects a second processing resource of the central processing resources for subsequent execution the program. The security control module then ascertains first execution settings of the program as used by the first processing resource and facilitates conversion of the first execution settings into second execution settings for the second processing resource. The security control module then de-assigns the first processing resource from executing the program and assigns the second processing resource to execute the program.

20 Claims, 28 Drawing Sheets

(56) References Cited

U.S. PATENT DOCUMENTS

| | | | |
|---|---|---|---|
| 2009/0319240 A1* | 12/2009 | Inada | G06F 17/5009 703/6 |
| 2010/0005531 A1* | 1/2010 | Largman et al. | 726/24 |
| 2010/0199052 A1* | 8/2010 | Inoue | G06F 9/4856 711/154 |
| 2011/0202739 A1* | 8/2011 | Grisenthwaite | 711/163 |
| 2012/0102200 A1* | 4/2012 | Rabii | G06F 9/5011 709/226 |
| 2013/0024937 A1* | 1/2013 | Glew | G06F 21/577 726/23 |
| 2013/0060939 A1* | 3/2013 | Bauer | G06F 21/54 709/224 |
| 2013/0139262 A1* | 5/2013 | Glew | H04L 63/1466 726/23 |
| 2013/0227634 A1* | 8/2013 | Pal | G06F 21/552 726/1 |
| 2013/0340081 A1* | 12/2013 | Sakthikumar et al. | 726/24 |
| 2014/0033217 A1* | 1/2014 | Vajda | G06F 9/528 718/102 |
| 2014/0052971 A1* | 2/2014 | Sehr et al. | 712/227 |
| 2014/0068625 A1* | 3/2014 | Winser | G06F 9/505 718/104 |
| 2014/0123235 A1* | 5/2014 | Dewan et al. | 726/4 |
| 2014/0173596 A1* | 6/2014 | Ng et al. | 718/1 |

\* cited by examiner

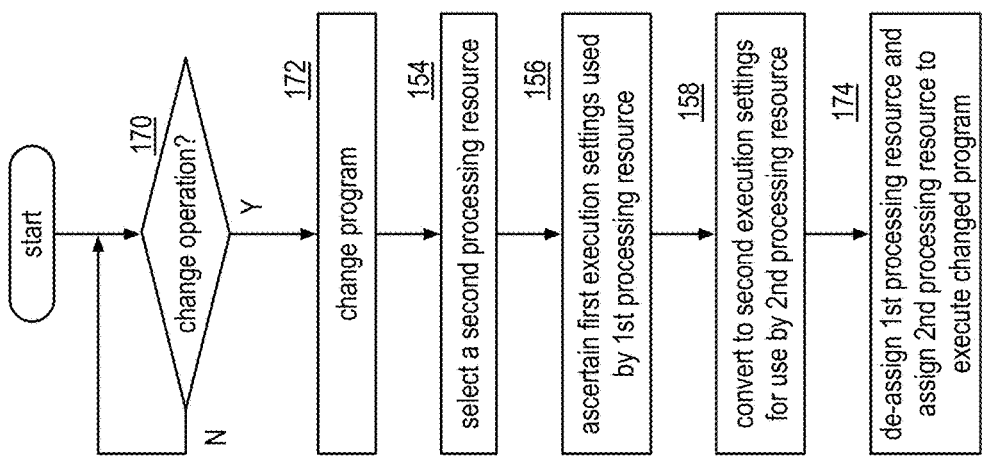
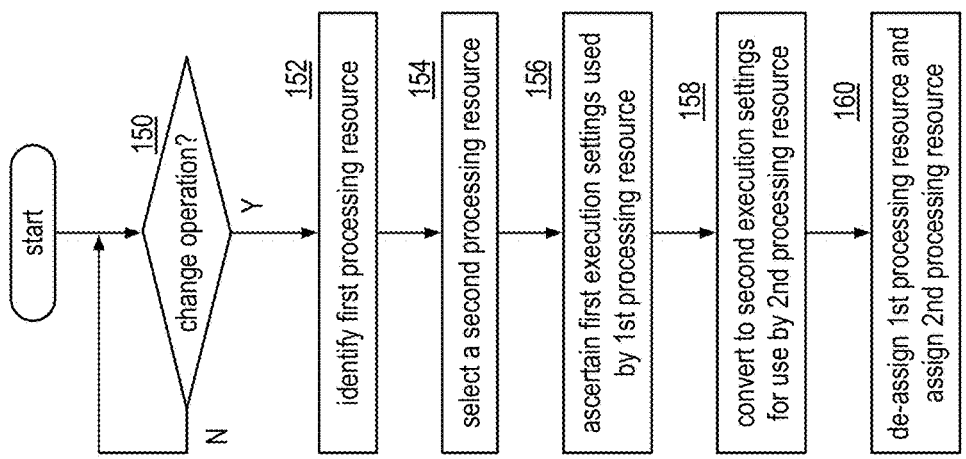

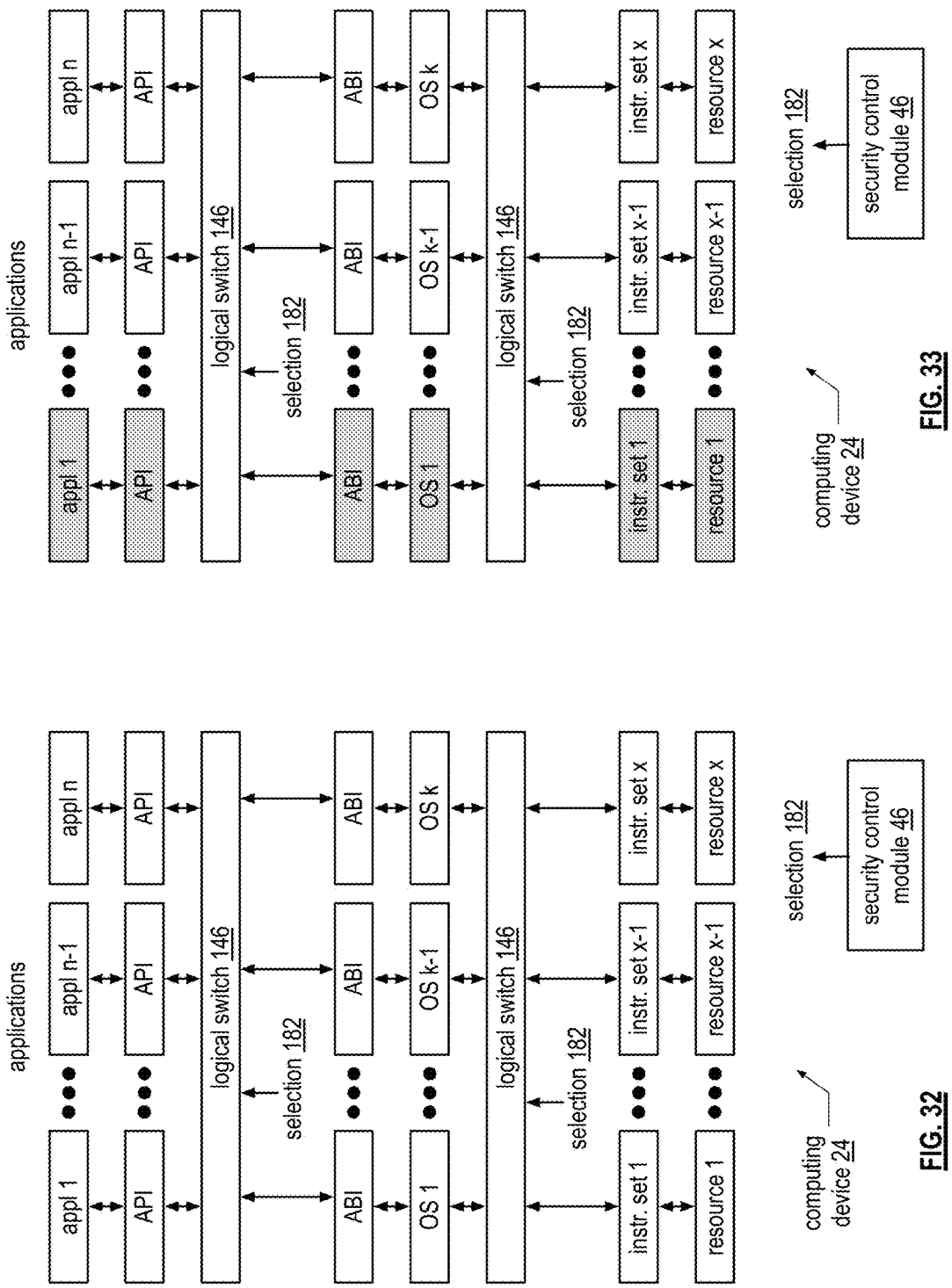

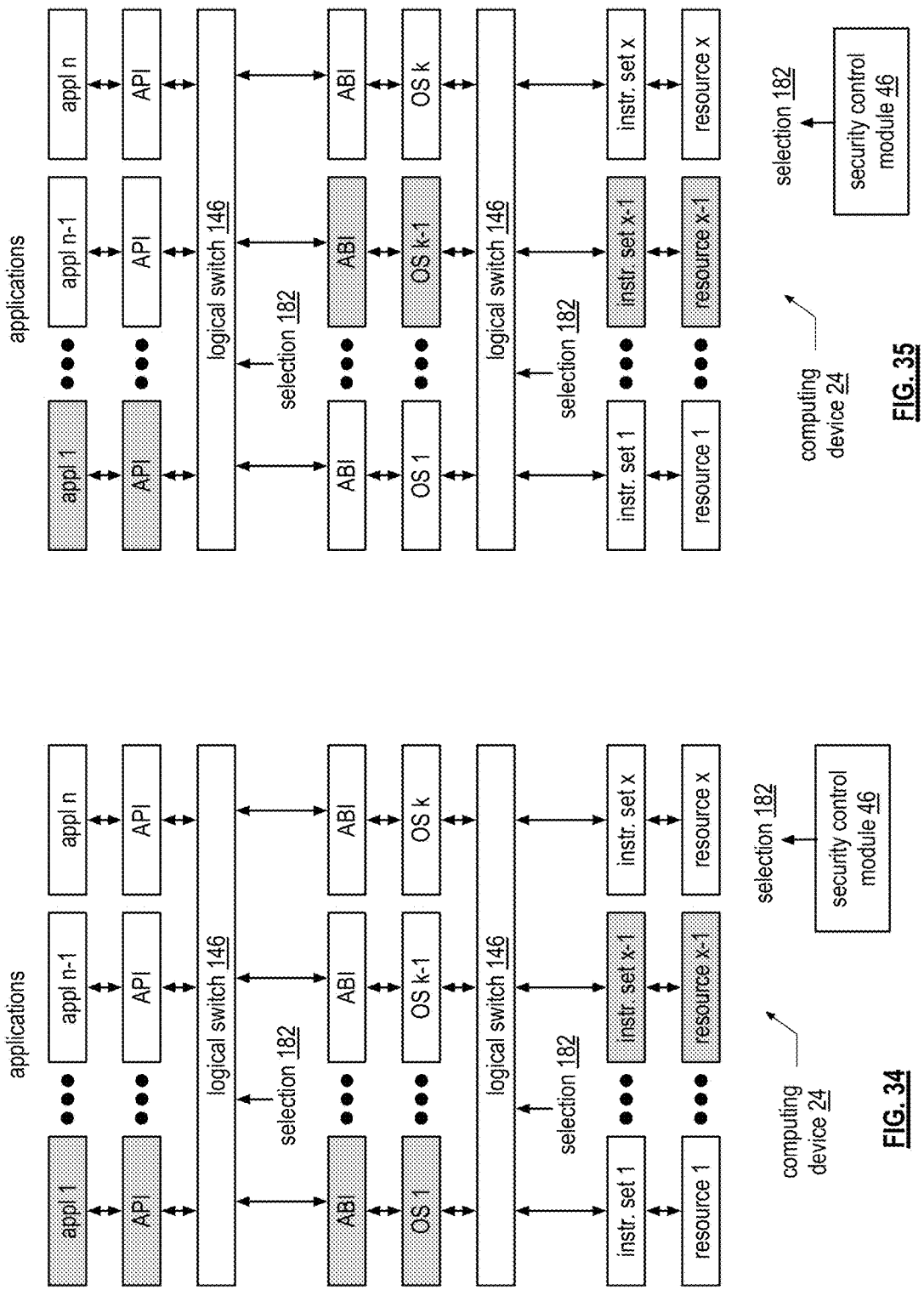

SECURE COMPUTING DEVICE USING DIFFERENT CENTRAL PROCESSING RESOURCES

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to security of the network and/or components thereof.

Description of Related Art

FIG. 1 illustrates a computer network that includes servers, user devices, a local area network (LAN), a modem, one or more networks, trusted hosts, untrusted hosts, and unknown hosts. The LAN and/or the modem include a firewall. Each server and user device includes a network interface, network security module, memory, a central processing unit (CPU), a controller, a user security module, a user interface, an admin security module, and an admin interface. The controller control user, administrator, and/or peripheral component input and output requests to access the memory, the CPU, and/or the network interface.

Each of the firewall, the network security module, the user security module, and the admin security module functions to protect the server or user device from malicious software attacks. Malicious software may come in the form of a virus, a worm, a backdoor, a root kit, and/or a Trojan horse; each of which has different versions with somewhat different purposes. In general, the purpose of malicious software is one or more of deleting files (user and/or system), changing files, changing disk formatting, damaging disks, slowing down the system, disabling computers, disabling network connections, installing backdoors and/or spyware to extract sensitive data, and/or spreading to other computers and servers.

Today, most malicious software detection techniques (e.g., antivirus software) are capable of detecting and preventing low to moderate sophistication attacks. Highly sophisticated attacks, however, are much more difficult to detect and prevent, which use techniques to blur technical distinctions between viruses, worms, and Trojan horses. Such highly sophisticated attacks are expense to develop and deploy; as such, they are typically funded by organizations that have unscrupulous intentions for large-scale computer network service disruption, extraction of a large amount of sensitive data, and/or extraction of highly sensitive data. Due to the intentions of highly sophisticated attacks, the targets of such attacks are typically banks, research organizations, security agencies and/or firms, etc.

FIGS. 2-8 illustrate an example of highly sophisticated malicious software attacking a prior art computer, which is representative of attacking a multitude of computers concurrently, sequentially, or exponentially. As shown in FIG. 2, the malicious software (SW) circumvents the malicious software detection techniques of the firewall, the network security module, the user security module, and the admin security module. This may occur as a result of a breach in network security, a breach in user security, unknowingly downloading a file, opening an email attachment, tricking antivirus software into passing the malicious software as a valid file, tricking network access security into believe the malicious software is a valid access, etc.

FIG. 3 illustrates the malicious SW establishing a beachhead with the computer (i.e., is stored in memory). Once the beachhead is established, the goal of the malicious software is to learn the hardware and software structures of the computer and vulnerabilities between the hardware and software interaction. The hardware structure includes memory (main memory and external memory), a central processing unit (CPU), network connections & devices, user input and output connections & devices, peripheral connections & devices, memory controller, input/output (TO) controller, etc. The software structure includes user applications, system applications, user data (e.g., files, address books, email, etc.), system data (e.g., buffers, stack pointers, physical memory mapping of data and program storage, virtual to physical memory mapping, routing tables, etc.), operating system (OS), BIOS (basic input output system), user security data (e.g., credit card information, banking information, passwords, user names, login information, etc.), system security data (e.g., encryption keys, key chains, etc.), etc.

At this stage of the malicious software attack, the hardware and software structures each appear as white space to the malicious software, which is shown in both of FIGS. 3 and 4. As such, the malicious software, from its beachhead position, monitors data flow between the hardware components to begin to map out the hardware and software structures, to learn the hardware software interaction vulnerabilities, to learn the security measures in place, and to increase its security level within the computer or server.

FIGS. 5 and 6 illustrate the malicious software learning the hardware structure, the software structure, learning the hardware software interaction vulnerabilities, the security measures, and increasing its security access within the computer or server. During the learning phase, the malicious software may use a backdoor to communicate its findings to the architect of the malicious software, which may further process the extracted data to determine the structures and/or to increase security access. The learning process typically takes weeks to months to learn enough about the structure and to increase security access before the malicious software can exploit the computer or server.

FIGS. 7 and 8 illustrate the malicious software exploiting the computer or server. At this stage, the malicious software has learned the hardware and software structures, their vulnerabilities, and has established itself as a high priority application of the computer or server; while being invisible to the user, system admin, and/or antivirus software. With this level of knowledge and security, the malicious software can extract whatever data it wants (e.g., bank accounts, credit card account information, prototype designs, secret data, confidential information, etc.); can alter or destroy any data and/or applications it wants; corrupt and data and/or applications it wants; and disrupt or shutdown operation of the computer or server.

BRIEF DESCRIPTION OF THE SEVERAL VIEWS OF THE DRAWING(S)

FIG. 27 is a logic diagram of another example of a method of securing a computing device in accordance with the present invention;

FIG. 28 is a logic diagram of another example of a method of securing a computing device in accordance with the present invention;

FIG. 32 is a schematic block diagram of another embodiment of a computing device in accordance with the present invention;

FIGS. 33-35 are schematic block diagrams of an example of changing processing resources of a computing device in accordance with the present invention;

DETAILED DESCRIPTION OF THE INVENTION

Figure 1:
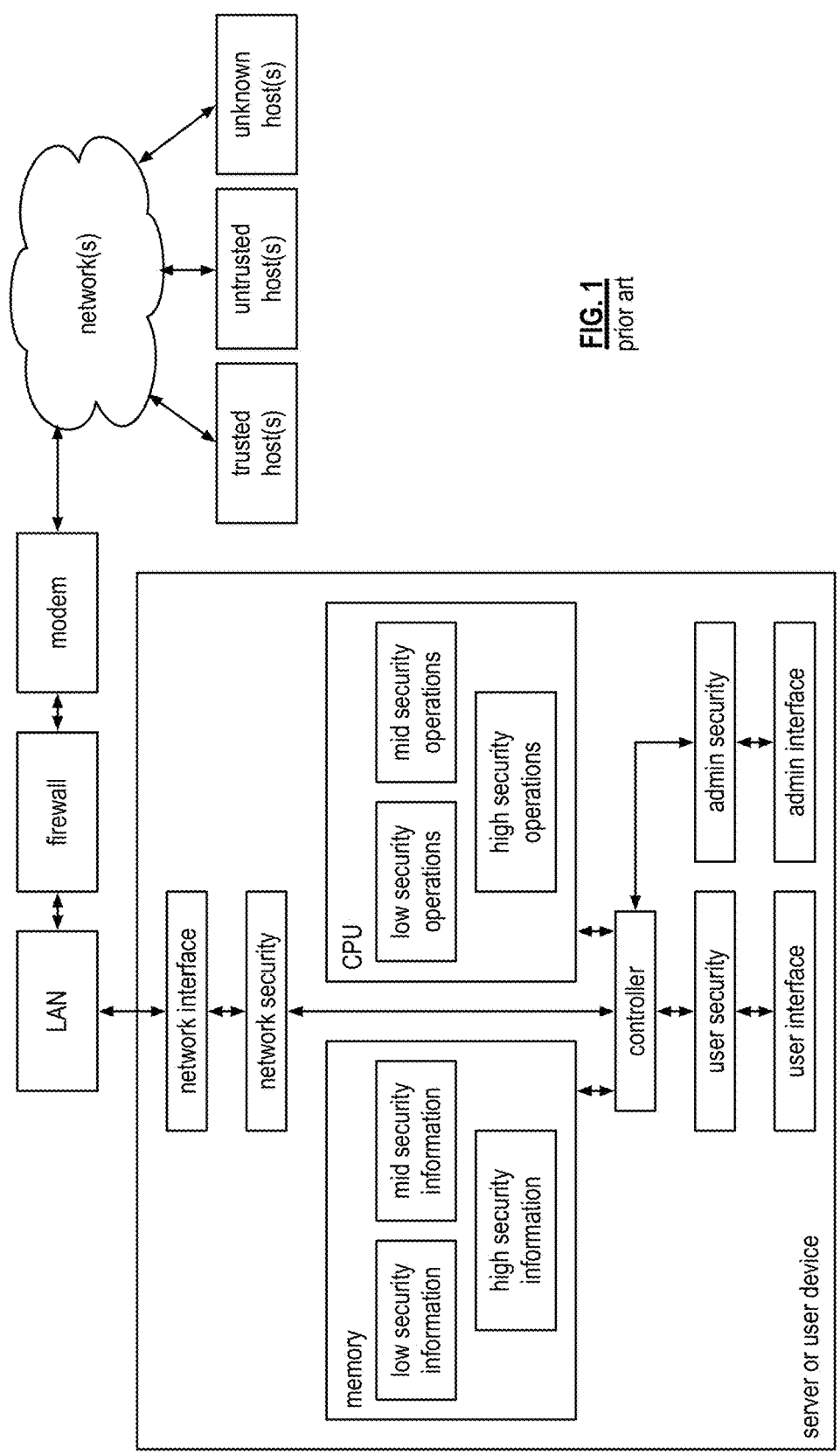
FIG. 1 illustrates a computer network of the prior art.
Figure 2:
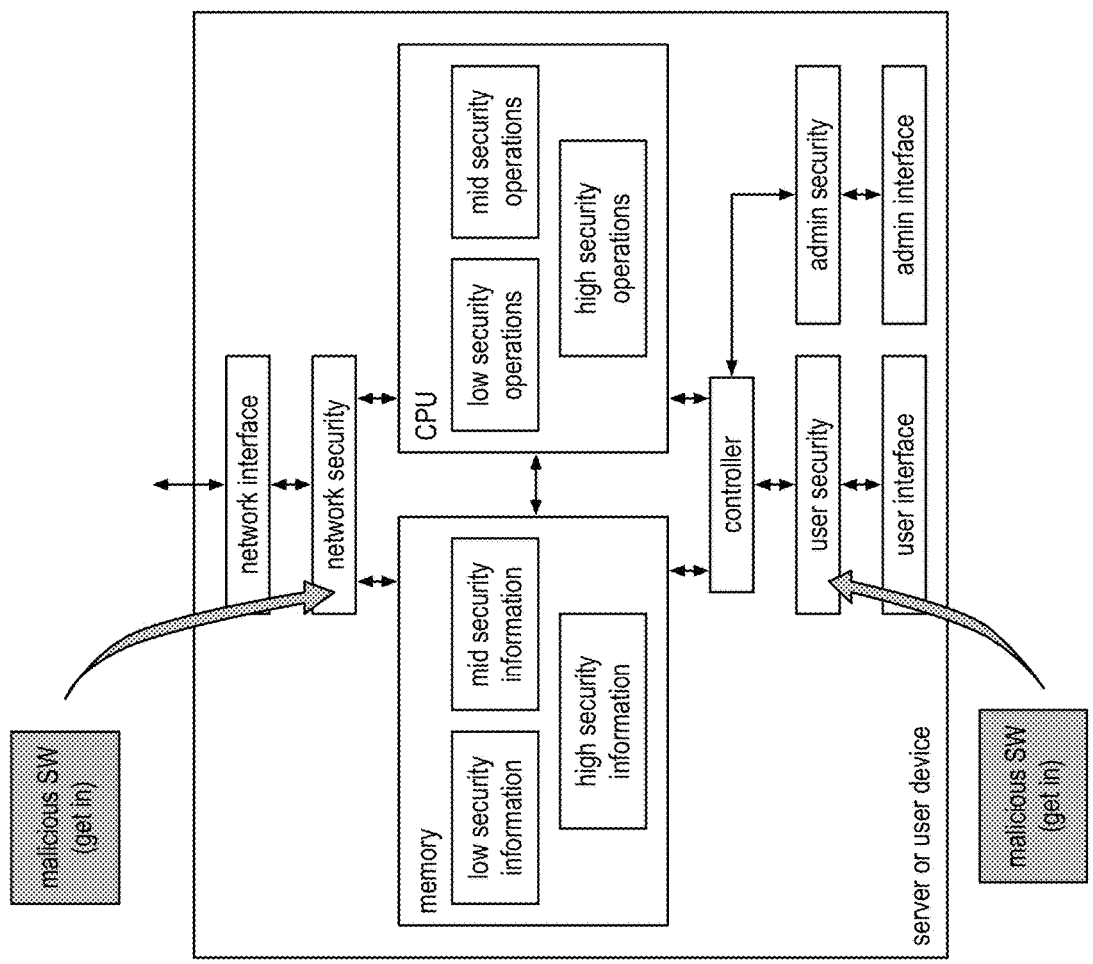
FIGS. 2-8 illustrate an example of malicious software attacking a prior art computer.
Figure 4:
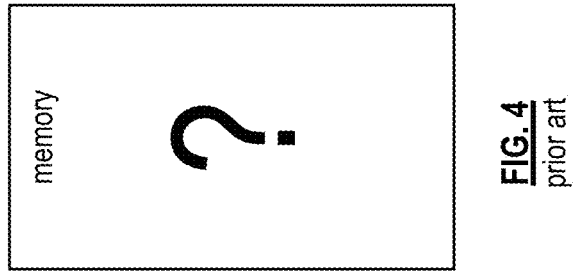
Figure 3:
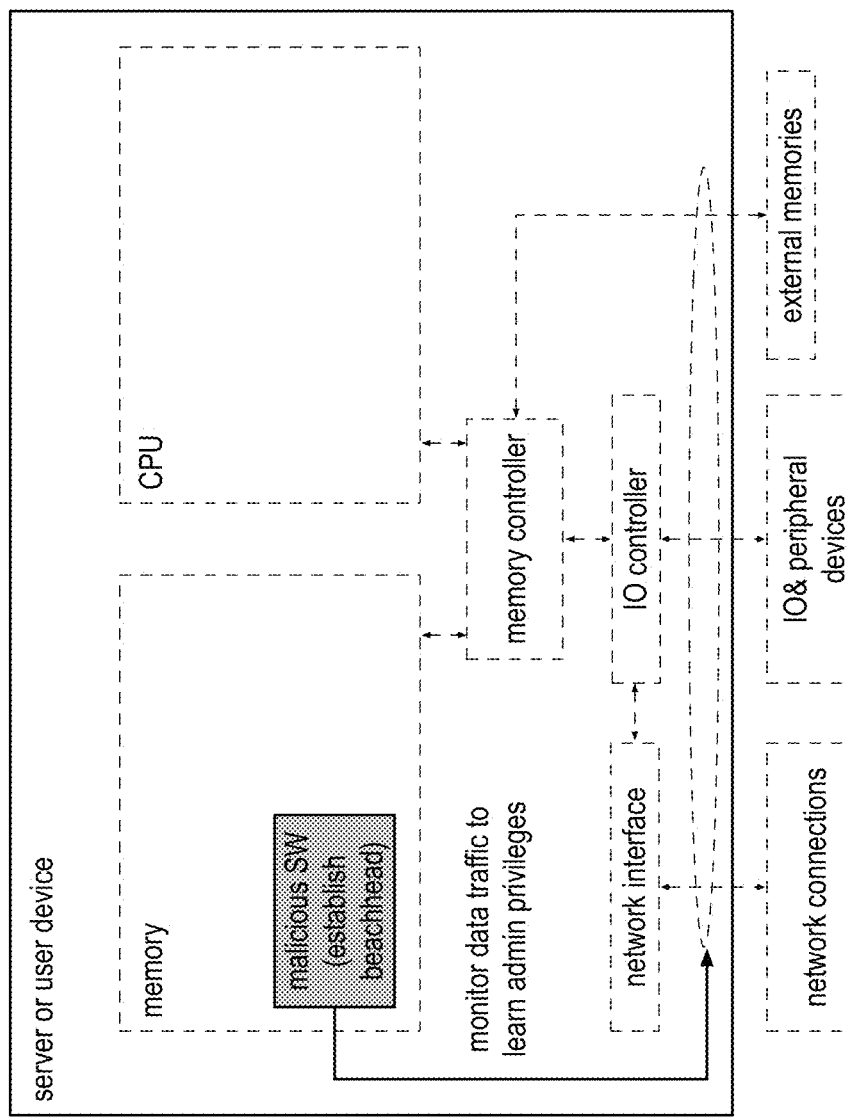
Figure 6:
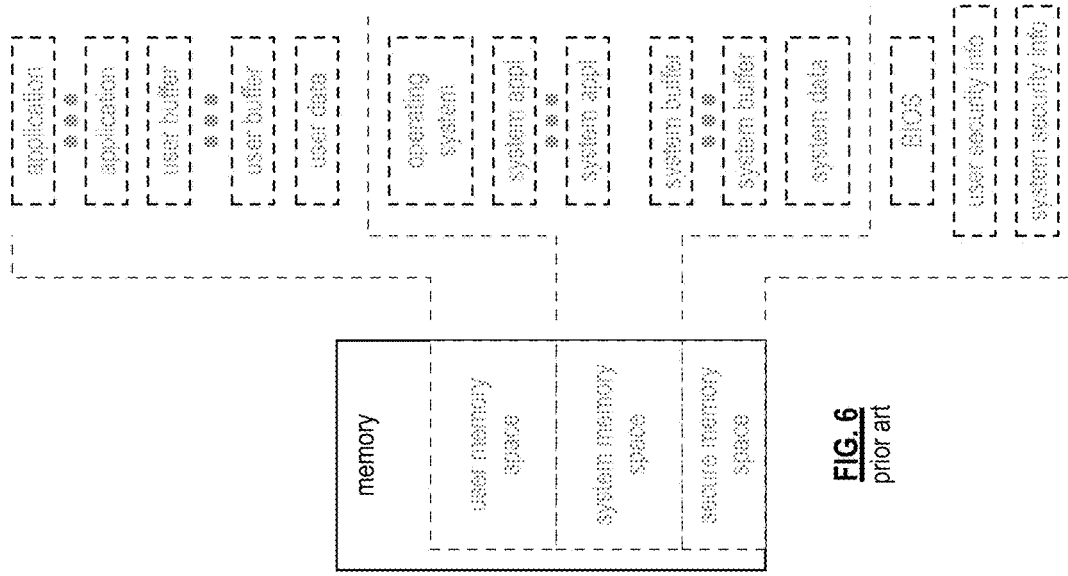
Figure 5:
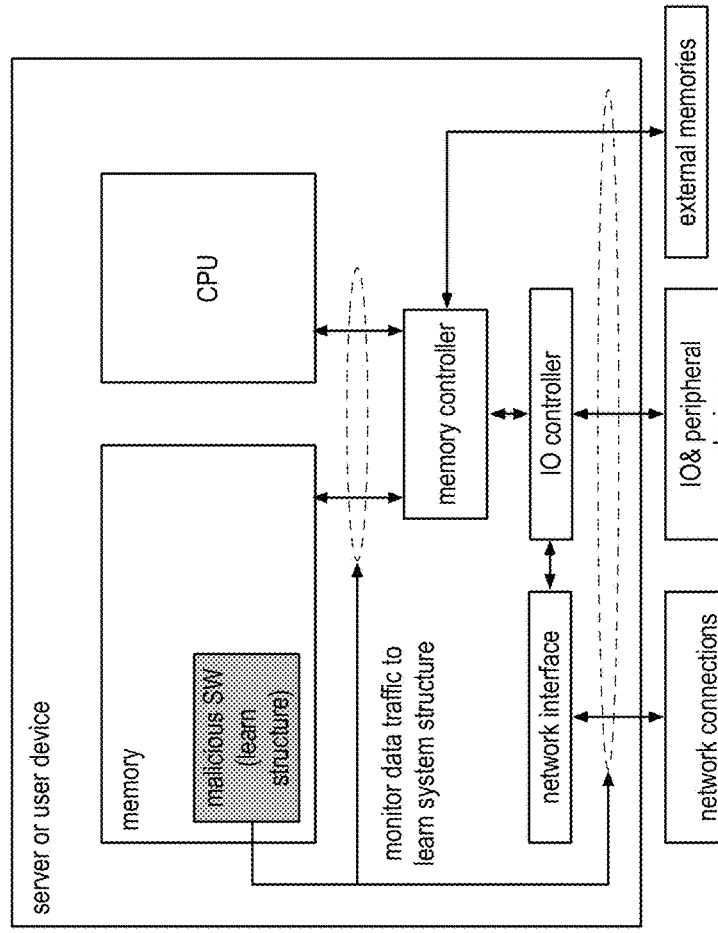
Figures 7, 8:
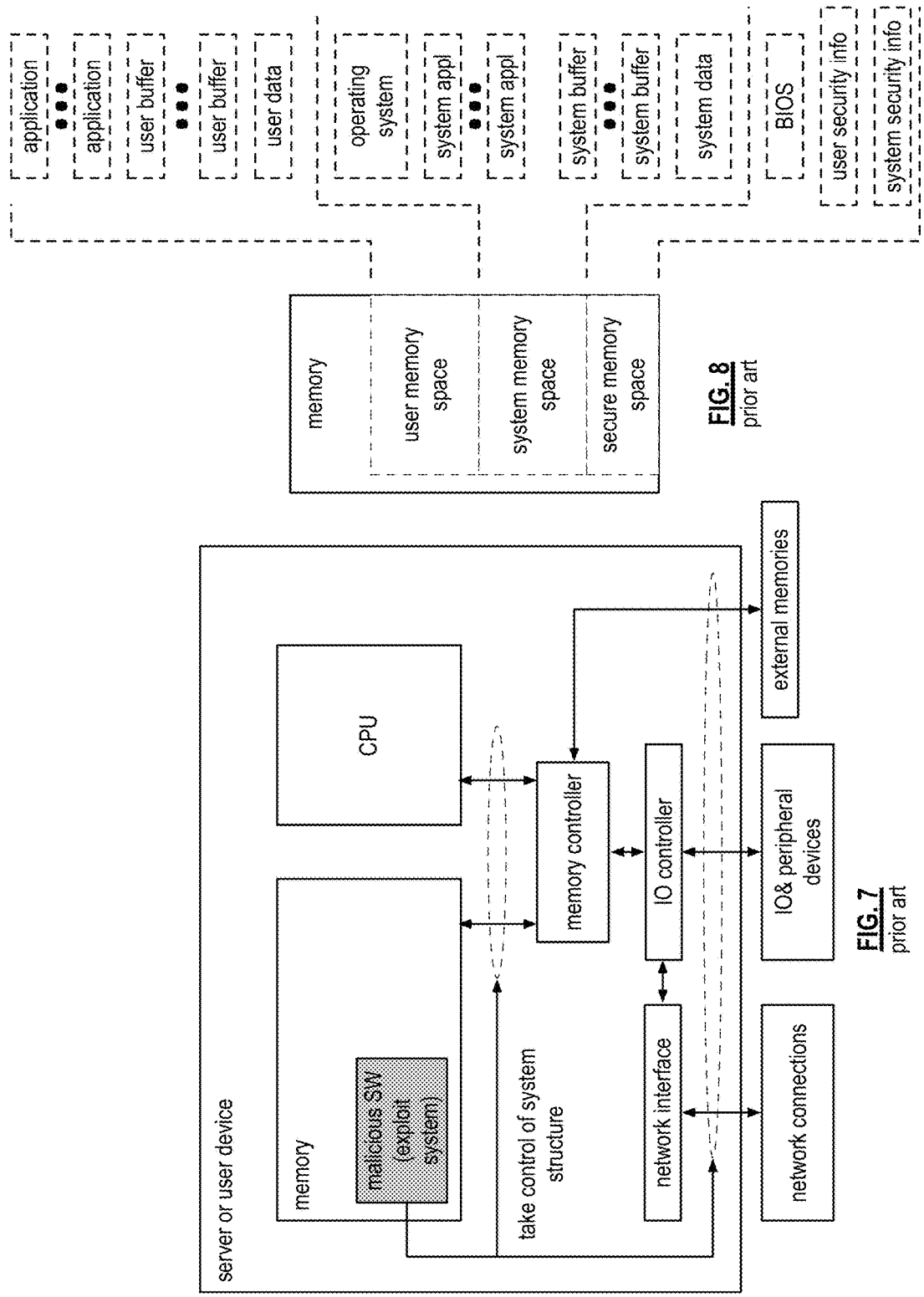
Figure 9:
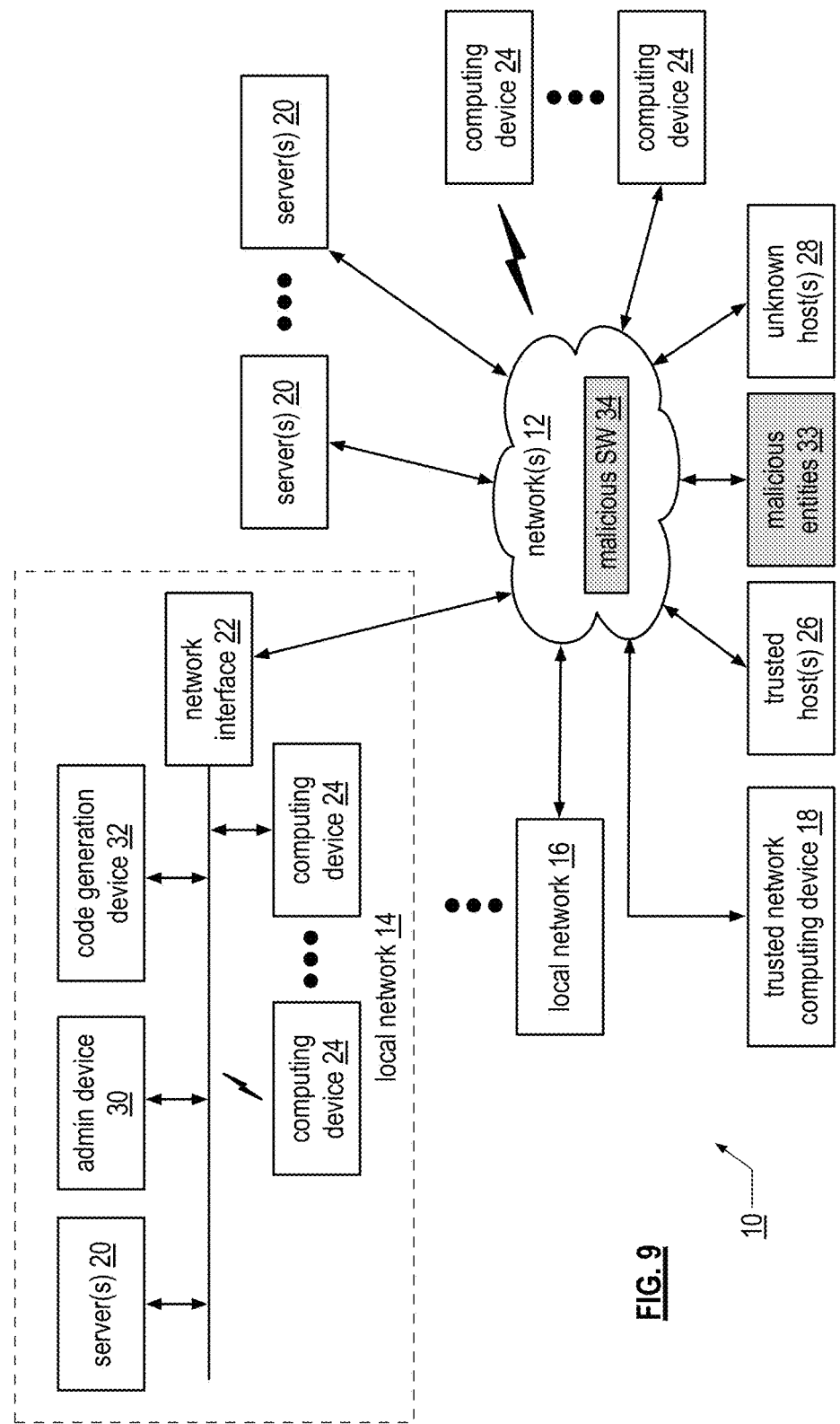
FIG. 9 is a schematic block diagram of an embodiment of a computer network in accordance with the present invention.

FIG. 9 is a schematic block diagram of an embodiment of a multiple user computer network 10 that includes one or more networks 12 (e.g., Internet, wide area networks, cellular networks, telephonic networks, etc.), local networks 14-16, one or more trusted network computing device 18, a plurality of servers 20, a plurality of computing devices 24, trusted hosts 26 (e.g., has a signed certificate, is known to user of a device, etc.), unknown hosts 28, a code generation device 32, a malicious entity 33, which places malicious software (SW) 34 into the network 12. Each the local networks 14-16 includes one or more of: one or more servers 20, a system admin device 30, one or more computing devices 24, and a network interface 22.

The computing devices 24 (e.g., personal computers, laptop computers, cellular telephones, tablet computers, etc.) and servers 20 are protected against the malicious software by routinely changing its software and/or how it processes the software. For example, by changing an application (e.g., user application, system application, operating system), or portion thereof, at a rate that is significantly less than the time it takes malicious software to learn the hardware and/or software structures (e.g., once a day, once a week, bi-monthly, monthly, etc.), the learning the malicious software has done prior to the change is meaningless. As another example, the computing device 24 and server 20 has access to a library of multiple versions of applications e.g., user application, system application, operating system), or portions thereof, and routinely selects a different version of an application, or portion thereof, which renders the learning of the malicious software prior to the change meaningless.

As yet another example, the computing device 24 and server 20 includes a plurality of central processing resources (e.g., one or more processing modules, one or more memory control units, one or more input/output interface control units, one or more peripheral control units, one or more video graphics processing units, additional main memory, and/or additional external memory) and routinely changes which processing resource processes which application, or portion thereof, which renders the learning of the malicious software prior to the change meaningless.

The changing of the application, or portion, can be done for each application stored in memory or used by the computing device or server such that, in a given time frame (e.g., a day, a week, etc.) the software stored on, or used by, the computing device 24 or server 20 is changed. Similarly, changing of the processing resources can be done for each application stored on or used by the computing device 24 or server 20.

Routinely changing an application, or portion thereof, and/or selecting different versions of an application, or portions thereof, rests, at least in part, on the ability to generate new versions and/or multiple versions of an application, or portions thereof, quickly and reliably. UniqueSoft, Inc. has developed one or more software creation tools that are capable of generating new versions and/or multiple versions of an application, or portions thereof, quickly and reliably. Such software creation tool(s) are described in co-pending patent application entitled, "SYSTEM AND METHOD FOR GENERATING APPLICATION CODE", having a filing date of Aug. 30, 2011, an application Ser. No. 13/221,595, now U.S. Pat. No. 8,972,928. The co-pending patent application is incorporated in this application its entirety by reference.

Figure 10:
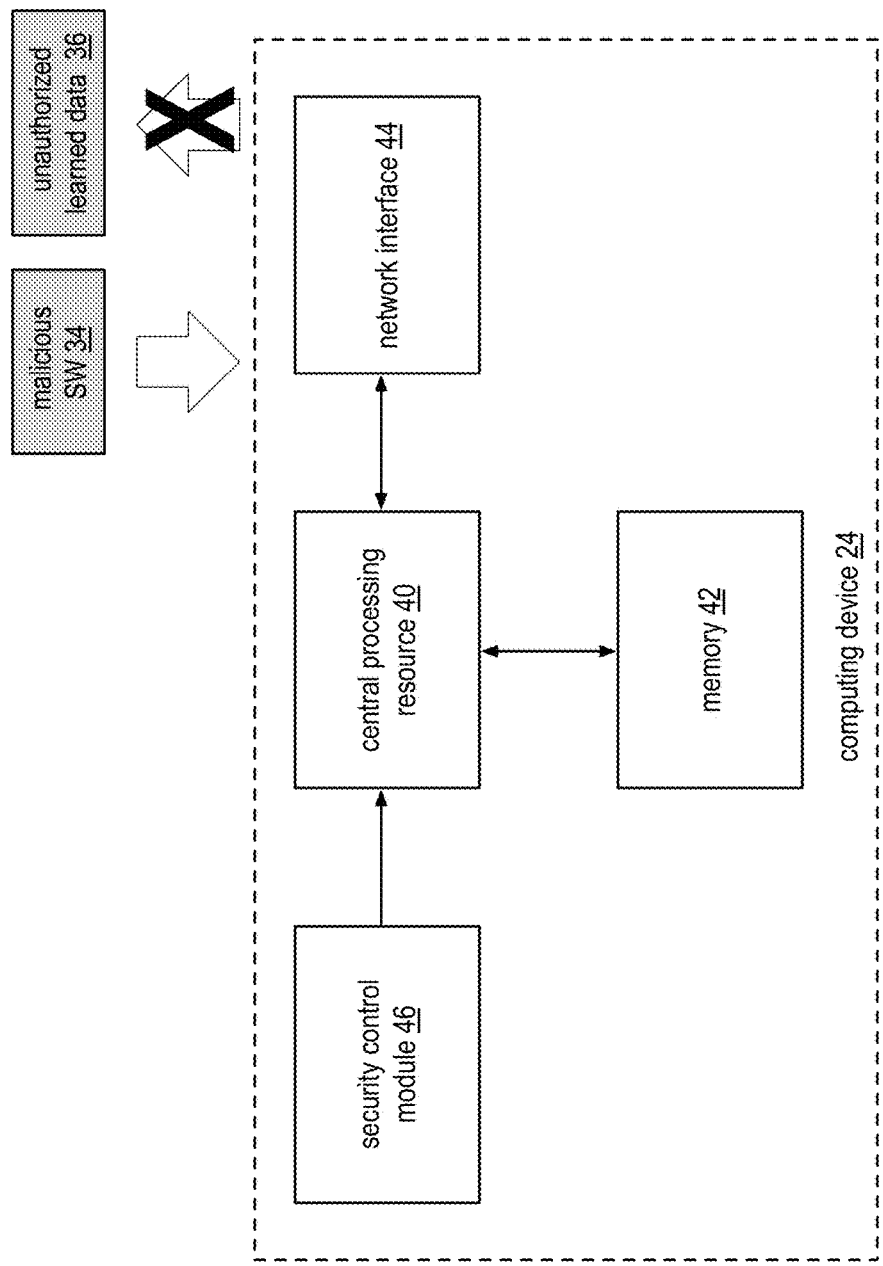
FIG. 10 is a schematic block diagram of an embodiment of a computing device in accordance with the present invention.

FIG. 10 is a schematic block diagram of an embodiment of computing device 24 that includes a central processing resource 40, memory 42, a network interface 44, and a security control module 46. Note that the computing device 24 may be a processing core of the server 20, of the code generation module 32, and/or of the trusted network computing device 18. The computing device 24 includes malicious software detection programs, which may miss highly sophisticated malicious software 34. If this occurs, the malicious software attempts to establish a beachhead and then begins learning the software structure, hardware structure, vulnerabilities, etc.

In an example, the security control module 46 determines when to change at least a portion of a program (e.g., an application, an OS, etc.) of the computing device 24. When the program, or portion thereof, is to be changed, the security control module 46 sends a request to a software generation module (e.g., code generation device 32, a code generation module, or trusted network computing device 18) for a new version of the program, or portion thereof. The security control module 46 then facilitates receiving the new version of the program, or portion thereof. The security module 46 then facilitates replacing, within the memory, the program, or portion thereof, with the new version of the program, or portion thereof. The next time the program is accessed, the central processing resource uses the new version of the program, or portion thereof, which changes internal operation of the computing device thereby reducing adverse impact of malicious software (e.g., learning the computing device and/or extracting unauthorized learned data).

In another example, the security control module 46 determines when to change a program (e.g., an application, an OS, etc.) of the computing device 24. When the program is to be changed, the security control module 46, accesses a library of programs (e.g., applications, OS, etc.) that includes a plurality of versions of the program, or portions thereof. The security control module 46 then functions to select one of the versions of the program, or portion thereof, and updates an active program list to include the selected program, or portion thereof. The next time the program is accessed, the central processing resource uses the selected version of the program, or portion thereof, which changes internal operation of the computing device thereby reducing adverse impact of the malicious software.

In yet another example, the security control module 46 determines when to change operation of a program (e.g., an application, an OS, etc.) of the computing device 24. When the operation of the program is to be changed, the security control module 46 identifies a first processing resource of the plurality of central processing resources that is currently assigned to execute the program, or portion thereof. The security control module 46 also selects a second processing resource of the central processing resources for subsequent execution the program, or portion thereof. The security control module 46 then ascertains first execution settings of the program as used by the first processing resource and facilitates conversion of them into second execution settings for use by the second processing resource. The security control module 46 then de-assigns the first processing resource from executing the program, or portion thereof, and assigns the second processing resource to execute the program, or portion thereof.

In a further example, the security control module 46 determines when to change operation of a program (e.g., an application, an OS, etc.) of the computing device 24. When the operation of the program is to be changed, the security control module 46 determines whether to change the program, or portion thereof and whether to change processing resources currently assigned to execute the program, or portion thereof. When both the program, or portion thereof, and the processing resource are to be changed, the security control module 46 facilitates a change of the program, or portion thereof, to produce a changed program, or portion thereof. The security control module 46 then selects a second processing resource to execute the changed program and ascertains first execution settings of the program as currently used by a first processing resource for executing the program. The security control module 46 then facilitates conversion of the first execution settings into second execution settings for the second processing resource. The security control module 46 then de-assigns the first processing resource from executing the program, or portion thereof, and assigns the second processing resource to execute the changed program, or portion thereof.

Figure 11:
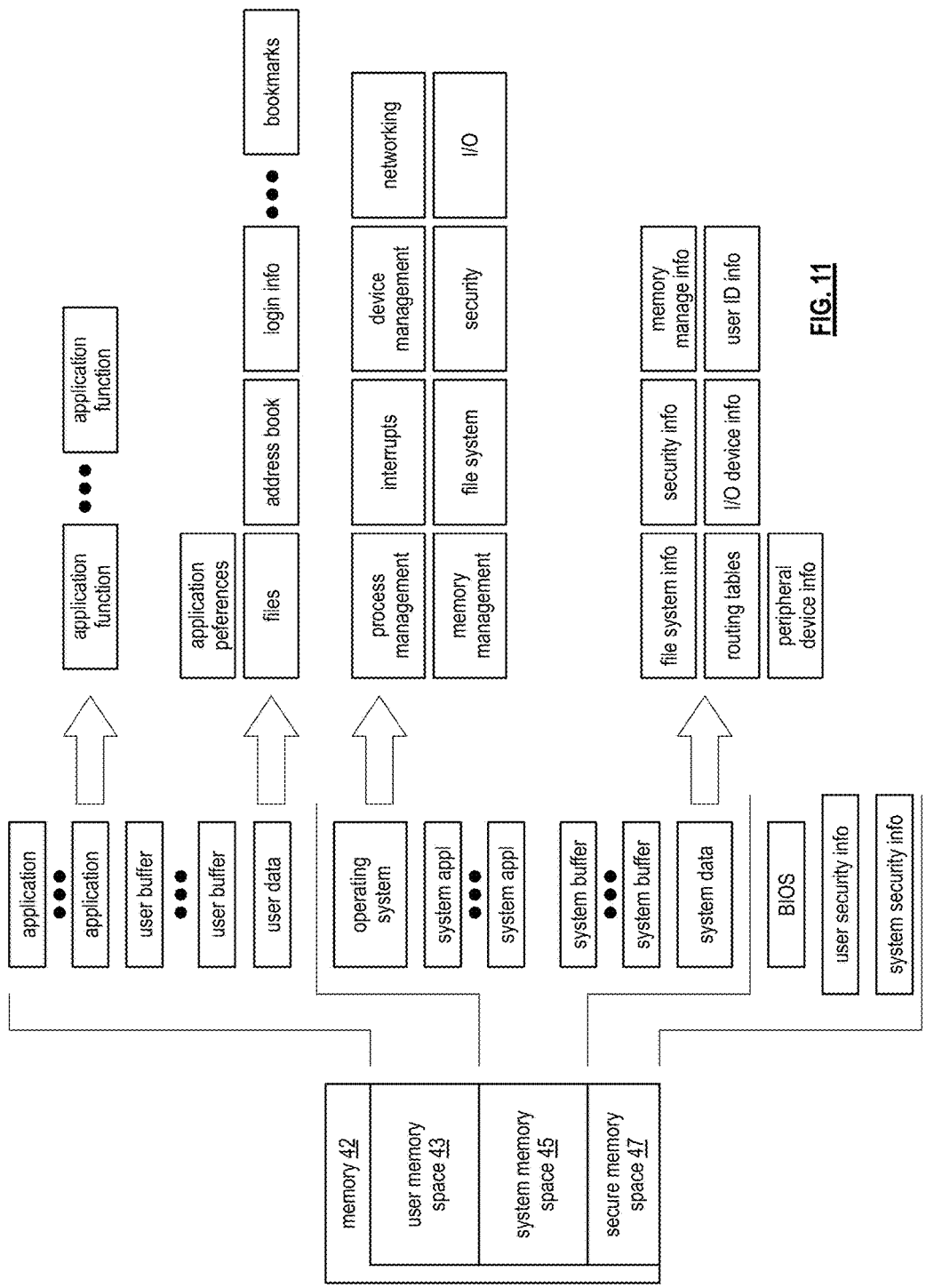
FIG. 11 is a schematic block diagram of an embodiment of a computing devices memory in accordance with the present invention.

FIG. 11 is a schematic block diagram of an embodiment of a computing devices memory 46 that is logically divided into a user memory space 43, a system memory space 45, and a secure memory space 47. The memory 42 includes the computing device's ROM (read only memory), main memory, cache memory, secondary memory (external local memory), and/or higher tiered memory (e.g., external remote memory, backup tapes, etc.).

The user memory space 43 stores user applications (e.g., user programs such as spreadsheets, databases, word processing, video games, Internet browser, audio/video recording and/or playback, calendar, email, etc.), user data (e.g., various types of files, address books, login information, bookmarkers, application preferences, etc.), and user buffer data (e.g., intermediate data produced by an executing program, temporary user settings, etc.). Each application may include a plurality of application functions (e.g., a block of operational instructions (or code), a block of code for a subroutine, etc.). Each of the application functions may be separately stored in the memory 42 (e.g., the application is not stored in a contiguous section of the memory).

The system memory space 45 stores one or more operating systems (OS), system applications (e.g., utility application, time/date, etc.), system buffer data, and system data.

The system buffer data includes intermediate data produced by an executing system program, temporary system settings, etc. The OS includes a plurality of OS functions (e.g., kernels), such as process management, interrupts, device management, networking, memory management, file system, security, and/or input/output (TO) management. Each OS function may include a plurality of OS sub-functions, which includes one or more blocks of code, or blocks of subroutine code. The system data includes file system information (e.g., directories, etc.), security information, memory management information (e.g., memory mapping, virtual to physical addressing, etc.), routing tables, IO device interface information, user ID (identification) information, anti virus software, and/or peripheral device information.

The secure memory space 47 stores secure information (e.g., information that the user of the computing device cannot access). Such secure information includes the BIOS, user security information (e.g., encryption keys, encryption protocols, etc.), and system security information.

The security control module 46 functions to make the data and/or programs stored in the memory 42 a moving target. As such, malicious software is severely limited on learning the software structure of the computing device.

Figure 12:
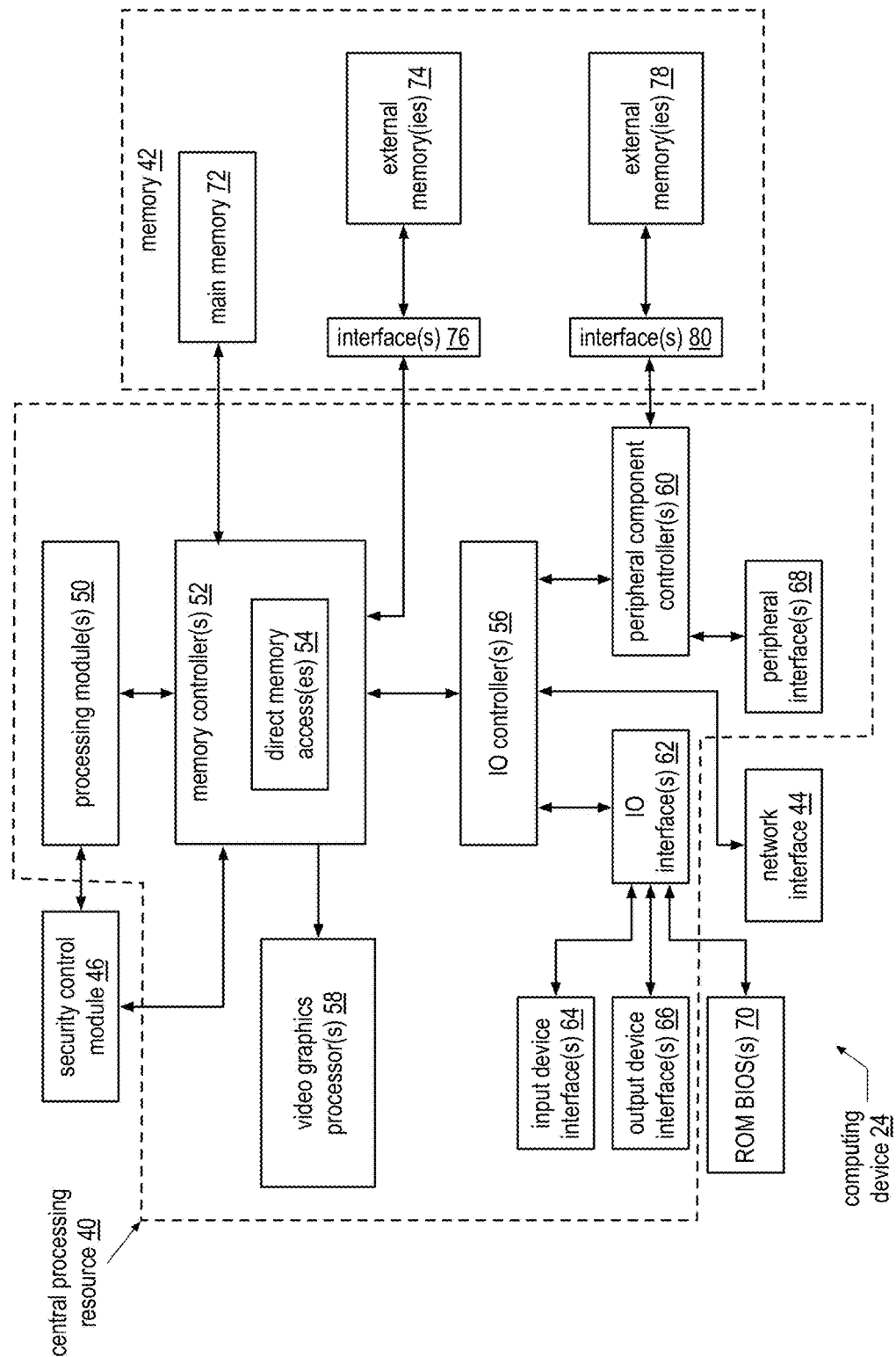
FIG. 12 is a schematic block diagram of another embodiment of a computing device in accordance with the present invention.

FIG. 12 is a schematic block diagram of another embodiment of a computing device 24 that includes the central processing resource 40, the memory 42, the network interface 44, the security control module 46, and a ROM BIOS 70. The central processing resource 40 includes one or more of: one or more processing modules 50, one or more memory controllers 52, one or more direct memory access units 54, one or more IO controllers 56, one or more video graphics processors 58, one or more peripheral component controllers 60, one or more IO interface controllers 62, one or more input device interfaces 64, one or more output device interfaces 66, and one or more peripheral interfaces 68. The memory 42 includes main memory 72, one or more external memory interfaces 76 80, and one or more external memories 74 78. The central processing resource 40 may further include additional memory, such as additional main memories, cache memory, program memory, etc.

In an example of operation, the processing module(s) 50 includes a control unit, an arithmetic and logic unit (ALU), and a co-processor. The control unit coordinates and controls a repetitive sequence of fetching, decoding, and executing operational instructions of blocks of code. The control unit determines the operational instruction, or group of operational instructions, that is to be performed next and fetches the operational instruction, or group of operational instructions, from memory 42. The control unit decodes a retrieved operational instruction by using an instruction decoder function to decipher the funtion to be performed and to identify the data on which the function is to be performed. The control unit also sets up logic paths (one or data and one for the function) for performing the function on the data.

The ALU and/or the co-process executes the function on the data to produce resulting data. The control unit coordinates storing the resulting data in an appropriate memory location in memory 42. Typically, the ALU executes mathematical and/or logic functions on the data and the co-processor executes complex functions. The control unit may receive some of the data on which functions are performed via the IO controller 56 and may output resulting data to the memory 42 via the IO controller 56.

To facilitate fetching, decoding, and executing operational instructions, the control unit includes a number of control registers that direct specific operations within the control processing resource 40. Such registers include, but are not limited to, control registers, program counter register, instruction register, general purpose registers, accumulator registers, stack pointer registers, and index registers. The registers are multi-bit memory storage elements and the number of bits is a function of the word length of the data and/or operational instruction buses of the central processing resource.

The control unit keeps track of where it is within a program and what needs to be done next. To accomplish this, the program counter register contains the address of the next operational instruction to be processed, and as the control logic is sequenced by the system clock, that instruction is loaded into the instruction register. On the next system clock cycle(s), the operational instruction in the instruction register is decoded by the instruction decoder. On a subsequent system clock cycle(s), the decoded operational instruction is executed by the ALU and/or co-processor.

The general purpose registers store data of various types that might be needed during the execution of a program, or portion thereof. The accumulator registers send data to the ALU and/or co-processors and store the resulting data. The stack pointer points to a location in memory 42 were interim address or program data is to be stored, and the index registers are used to support address offsets (i.e., used to point to specific regions of the memory).

In another example of operation, a user of the computing device 24 enters an input via an input device (e.g., keyboard, keypad, mouse, touchscreen, etc.) to evoke a program (e.g., an application). The input is routed via the input interface 64, the IO interface 62, and the IO controller 56, and the memory controller 52 to the processing module 50. The processing module 50 executes one or more operational instructions of an OS to interpret the input and identify the program to be opened. The processing module executes additional operating instructions of the OS to open the identified program. In additional, the video graphics processor 58 may be performing corresponding operational instructions to provide a graphical representation of the program opening. To execute the program, the central processing resource 40 may function as discussed in the preceding example.

Typically, the central processing resource 40 is supporting concurrent execution of multiple programs (user applications and/or system applications) and execution of the OS. In this instance, the process management functions of the OS is used to share the central processing resource among the programs such that, to the user, it appears that the programs are running concurrently.

Figure 13:
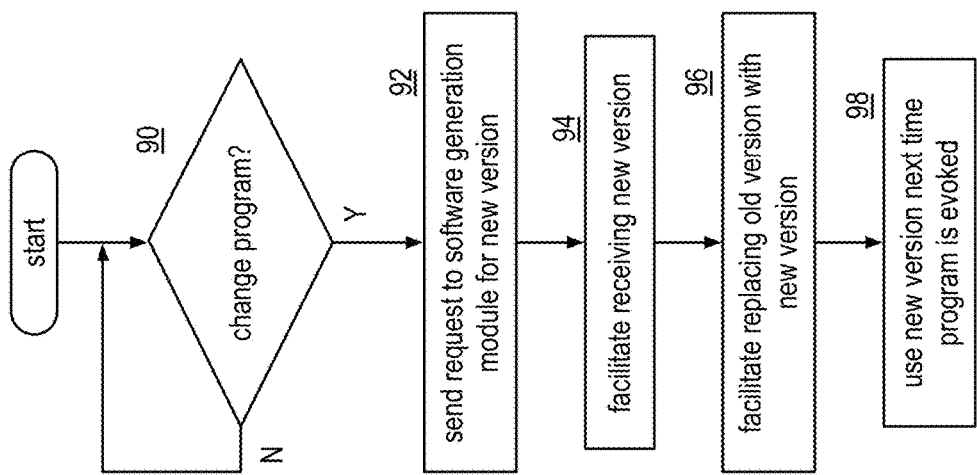
FIG. 13 is a logic diagram of an example of a method of securing a computing device in accordance with the present invention.

FIG. 13 is a logic diagram of an example of a method of securing a computing device 24 that begins at step 90 where the security control module 46 determines to change a program, or portion thereof, for security purposes (e.g., thwart effectiveness of malicious software that has circumvented anti malicious software algorithms and entered the computing device). The program may be an operating system (OS) that includes a plurality of OS functions, a user application that includes a plurality of user application functions, or a system application that includes a plurality of system application functions.

The OS functions include process management, interrupts, device management, networking, memory management, file system, security, and input/output management. Each of the OS functions may include one or more OS function sub-routines and wherein a portion of the OS includes an OS function or an OS function sub-routine. A user application function includes one or more user application function sub-routines, where a portion of the user application includes the user application function or a user application function sub-routine. A system application function includes one or more system application function sub-routines, wherein a portion of the system application includes the system application function or a system application function sub-routine.

The decision as to which program to change and/or when to change it, or portion thereof, may be done in a variety of ways. For example, the security control module 46 may use a pseudo random sequence to identify, at pseudo random time intervals, the program, or portion thereof, from a plurality of programs. For instance, each interval of the pseudo random sequence identifies a different program of the plurality of programs, where the pseudo random sequence repeats at a cycle once a day, once a week, once a month, etc. such that each program, or portion thereof, is changed at least once in the repeating cycle.

As another example, the security control module 46 determines to change the program, or portion thereof, when the program has been evoked a predetermined number of time or a pseudo random number of times. For instance, every tenth evoking (e.g., opening, use, etc.) of the program, it, or a portion thereof, is changed. The number, whether fixed or pseudo random, the number is selected to minimize the malicious software's ability to learn about the program. As yet another example, the security module 46 may receive a command from a trusted management device 18 that identifies the program, or portion thereof, and when it is to be changed (e.g., now, within the next 24 hours, when it has been evoked a number of times, etc.).

As a further example, the security control module 46 determines to change the program, or portion thereof, when the program is operating outside of anticipated normal operating parameters. For instance, the security control module 46 tracks a program's performance characteristics (e.g., speed of execution, error rate, crashing, memory consumption, frequency of evoking, etc.) and, when the performance characteristics deviate from normal levels (e.g., deviate by a few percent or more), the security control module 46 determines to change the program, or portion thereof.

The method continues at step 92 where the security control module 46 sends a request to a software generation module for a new version of the program, or portion thereof. The software generation module, which may reside in the computing device 24, within the trusting computing device 18, or within the code generation device 32, generates the new version of the program, or portion thereof, based on the same, or similar, input requirements used to develop the current program, or portion thereof. In this manner, the function of the program, or portion thereof, will be the same or similar, but the operational instructions of the new version will likely differ from the operational instructions of the current version, thus rendering any learning the malicious software may have acquired of the current program will be rendered useless. The software generation module includes software creation tools are described in co-pending patent application entitled, "SYSTEM AND METHOD FOR GENERATING APPLICATION CODE", having a filing date of Aug. 30, 2011, an application Ser. No. 13/221,595, now U.S. Pat. No. 8,972,928.

The method continues at step 94 where the security control module 46 facilitating receiving the new version of the program, or portion thereof. The facilitating includes one or more of including addressing information in the request to receive the new version via the network interface 44 or a LAN interface, receiving the new version, providing instructions to send the new version to memory 42, etc. The facilitating may also include authenticating the new version of the program, or portion thereof, based on a trusted relationship with the software generation module. For instance, the security control module 46 authenticates the new version by verifying a signed certificate of the trusted source, by decrypting the new version using a public key of a public-private key pair of the trusted source, etc.

The method continues at step 96 where the security control module 46 facilitating replacing, within the memory, the program, or portion thereof, with the new version of the program, or portion thereof. For example, the security control module 46 facilitates writing the new version of the program, or portion thereof, to the memory and coordinates updating a memory mapping for the program to include the new version of it, or a portion thereof, and to exclude the old version of the program, or portion thereof. For instance, the new version of the program, or portion thereof, is written into different memory locations than the old version, which further aids in the thwarting of the malicious software. The older version may be passively erased (e.g., pointers deleted and eventually overwritten with other data or operational instructions) or actively erased (e.g., use a shredding program to remove the operational instructions of the old version).

The method continues at step 98 where, when the program is evoked, the central processing resource uses the new version of the program, or portion thereof, such that execution of the program is changed. By changing internal operation of the computing device 24 reducing adverse impact of malicious software.

Figure 14:
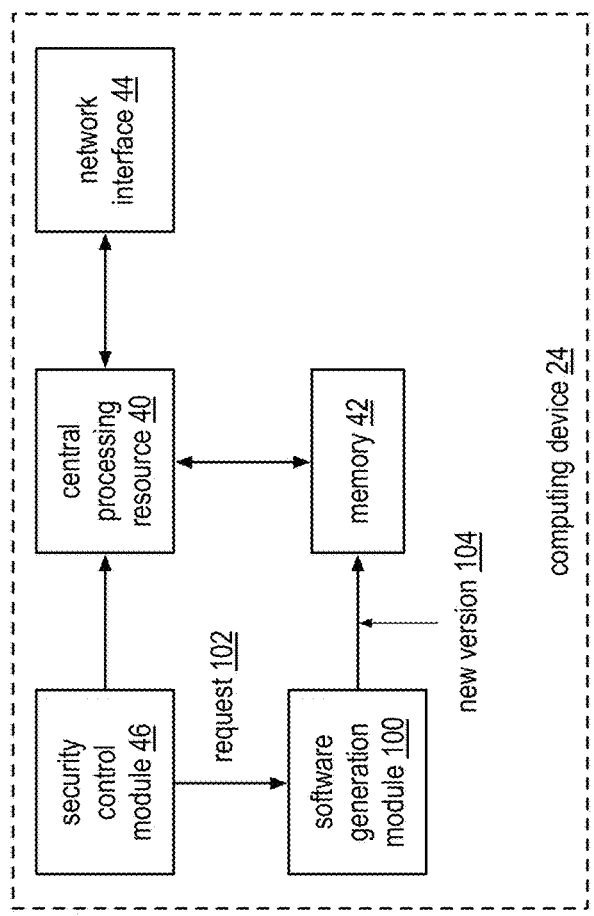
FIG. 14 is a schematic block diagram of another embodiment of a computing device in accordance with the present invention.

FIG. 14 is a schematic block diagram of another embodiment of a computing device 24 that includes the central processing resource 40, the memory 42, the network interface 44, the security control module 46, and a software generation module 100. In this embodiment, when the security control module 46 determines that a program, or portion thereof is to be changed, it sends a request to the software generation module 100 to generate the new version of the program, or portion thereof. The requests a local address of the software generation module 100 and may further include input requirements for the program, or portion thereof.

The software generation module 100 uses the input requirements to generate application requirements, which the software generation module uses to generate the new version of the at least a portion of the program. The input requirements include, but are not limited to, one or more if-then-else statements, one or more state table(s), one or more message sequence charts (e.g., MSC), and/or another agreed up format. The software generation module 100 includes software creation tools to convert the input requirements into one or more blocks of code as described in co-pending patent application entitled, "SYSTEM AND METHOD FOR GENERATING APPLICATION CODE", having a filing date of Aug. 30, 2011, an application Ser. No. 13/221,595, now U.S. Pat. No. 8,972,928.

Figure 15:
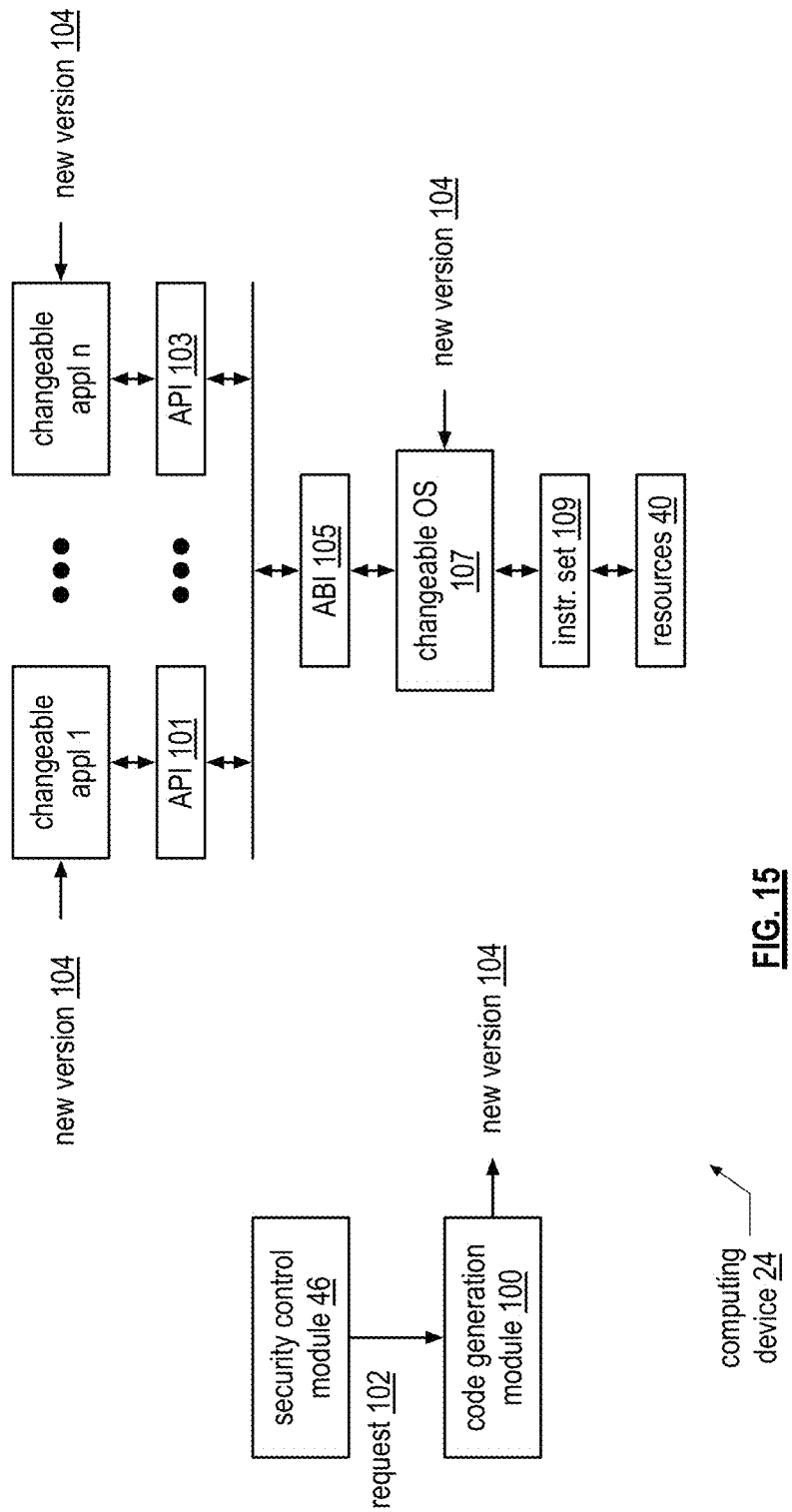
FIG. 15 is a schematic block diagram of another embodiment of a computing device in accordance with the present invention.

FIG. 15 is a schematic block diagram of another embodiment of a computing device 24 that includes the security code module 46, the code generation module 100, a plurality of changeable applications (user and/or system) (1-n), a corresponding plurality of application programming interfaces (API) 101-103, a changeable operating system (OS) 107, application binary interface (ABI) 105, one or more central processing resources 40, and a corresponding instruction set 109. The security control module 46 determines intervals at which one or more applications, or portions thereof, and/or the operating system, or portions thereof, are changed (e.g., create new versions while maintaining equivalent functionality). Note that the security control module 46 may also initiate a change to one or more APIs and/or to the ABI.

In an example of operation, the security control module 46 determines to change the operating system 107 by periodically switching to a new compiled version of the OS, or one or more portions thereof. For example, the code generation module 100 generates new versions of the OS, or portions thereof, using automated code generation techniques, such as those described in the above referenced co-pending patent application. In this approach, the newly compiled versions of the OS are generated by changing parameters in the software generation tools that determine the specific instructions and instruction sequences that are used in the interior of the final compiled code. This can be done without changing the overall functionality of the resulting block, or blocks, of code by maintaining the same functional requirements (e.g., input, parameters, application requirements, etc.) for the newly compiled OS, or portion thereof.

By periodically changing the OS 107 the vulnerabilities that may exist in any one version of the OS are changed, which neutralizes attack techniques that are based on the time consuming process of identifying and exploiting these vulnerabilities. In addition, in the event an intrusion has occurred but has not been detected—a serious threat for many of today's intrusion attacks—the OS change neutralizes any OS centric intrusion software (e.g., worms and/or viruses) that may have been secretly stored in the memory of the computer system.

In another example of operation, the security control module 46 determines to change the applications by periodically selecting an application to change. For the selected application, the security control module 46 instructs the code generation module 100 to compile a new version of the selected application, or one or more portions thereof. For example, the code generation module 100 generates new versions of the selected application, or portions thereof, using automated code generation techniques, such as those described in the above referenced co-pending patent application. In this approach, the newly compiled versions of the selected application are generated by changing parameters in the software generation tools that determine the specific instructions and instruction sequences that are used in the interior of the final compiled code. This can be done without changing the overall functionality of the resulting block, or blocks, of code by maintaining the same functional requirements (e.g., input, parameters, application requirements, etc.) for the newly compiled application, or portion thereof.

In another example of operation, the security control module 46 instructs the code generation module 100 to include one or more operating system functions in a newly compiled version of an application. In one instance, each application includes its own embedded OS 107 such that, when the application is changed, its own OS, or portions thereof, is also changed. As such, each application includes an API and a version of the ABI to directly communicate with the instruction set 109. In a specific example, the applications would share OS functions such as process management, interrupts, memory management, device management, IO functions, networking, and/or file system. In another specific example, each application includes its own OS functions for file system and memory management, while common OS functions of process management, interrupts, etc. are performed by an OS 107.

Figure 16:
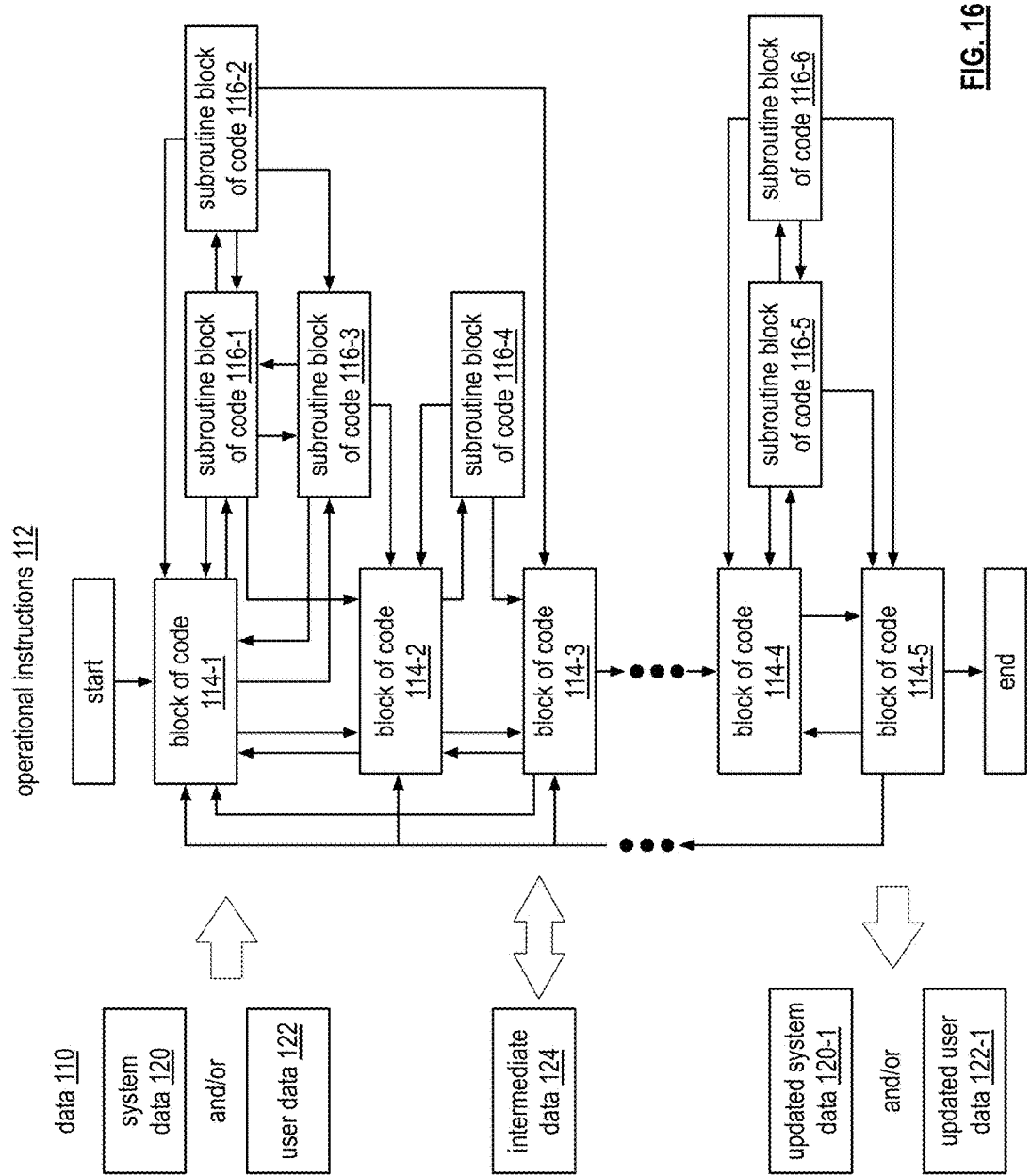
FIG. 16 is a schematic block diagram of an example of an application executable by a computing device in accordance with the present invention.

FIG. 16 is a schematic block diagram of an example of an application executable by a computing device 24. The program includes operational instructions 112, which include a plurality of blocks of code 114 and a plurality of subroutine blocks of code. Some of the operational instructions include instructions regarding data 110. For example, an operational instruction includes a command to retrieve system data 120 and/or user data 122. As another example, an operational instruction includes a command that produces intermediate data 124 from other data 110, or from scratch.

In an example of operation, an application, or program, is selected via conventional computer means to be executed. The program may be an operating system (OS) that includes a plurality of OS functions, a user application that includes a plurality of user application functions, or a system application that includes a plurality of system application functions. As an example, the OS functions including process management, interrupts, device management, networking, memory management, file system, security, and input/output management. As another example, the user application functions include one or more user application function subroutines that are dependent on the purpose of the application. As yet another example, the system application functions include one or more system application function sub-routines. Note that a block of code and/or a subroutine block of code may correspond to a function, a portion of a function, and/or multiple functions of the application.

Once the program is selected, a first block of code 114-1 of operational instructions 112 is executed. The first block of code 114-1 may be to initialize the program, initialize counters, initialize registers, retrieve initial data 110, etc. As the first block of code 114-1 is executed, one or more determinations are made as to which block of code or subroutine block of code is to be executed next and/or whether the processing of the first block of code is to be interrupted to execute a subroutine block of code. For example, while executing the first block of code 114, a determination is made to jump to subroutine block of code 116-1. As subroutine block of code 116-1 is executed to perform a function, or portion thereof, it makes one or more determinations as to which block of code or subroutine block of code is to be executed next. As an example, the execution of the program may jump back to the first block of code 114-1, it may proceed to another subroutine block of code 116-2 or 116-3, or it may proceeds to a second block of code 114-2. Note that a string of subroutine blocks of code may be executed before returning to the main flow of program execution (e.g., executing the blocks of code 114).

At some point in the execution of the program, the execution will proceed to block of code 114-2 (e.g., via block of code 114-1, subroutine blocks of code 116-1 or 116-3). While the second block of code 114-2 is executing, it may generate and/or use intermediate data 124, which is stored in cache and/or main memory. In addition, the second block of code 114-2 makes determinations as to where the program is to proceed next and/or whether the execution of the second block of code 114-2 should be interrupted for execution of one or more subroutine blocks of code. In this example, the second block of code 114-2 may proceed to, or be interrupted to jump to, a fourth subroutine block of code 116-4. As another possibility, the second block of code 114-2 may proceed to the third block of code 114-3 or may repeat at least a portion of the first block of code 114-1.

The execution of the operational instructions 112 of the program, or application, continues via block of code 114-4 and one or more of subroutine blocks of code 116-5 and 116-6 until it is to be closed. At this point, the fifth block of code 114-5 is executed to shutdown the program, which includes outputting updated system data 120-1 and/or updated user data 122-1 and performing other functions to safely shutdown or suspend the program.

When the security control module 46 identifies the program of FIG. 16 for have a new version created, the entire program (e.g., all of the blocks of code 114 and all of the subroutine blocks of code 116) may be generated as discussed above. Alternatively, one or more blocks of code 114 may be selected to have a new version created and/or one or more subroutine blocks of code 116 may be selected to have a new version created. Since the functionality of the application, of a block of code, and/or of a subroutine block of code is predicated on input requirements, the application, block of code, and/or subroutine block of code may be recreated using the same input requirements and different parameters to create a different version (e.g., includes at least one different operational instruction) of the application, or portion thereof, that performs the same functions, or function. For instance, the parameters prescribe physical, logical, and/or developmental constraints on implementing the blocks of code 114 and/or 116. For example, the physical parameters may include physical limitations of the system (e.g., clock rates, processing rates, data transference rates, etc.) and logical parameters may include software limitations (e.g., desired programming language, desired operating system, desired API, etc.).

Figure 17:
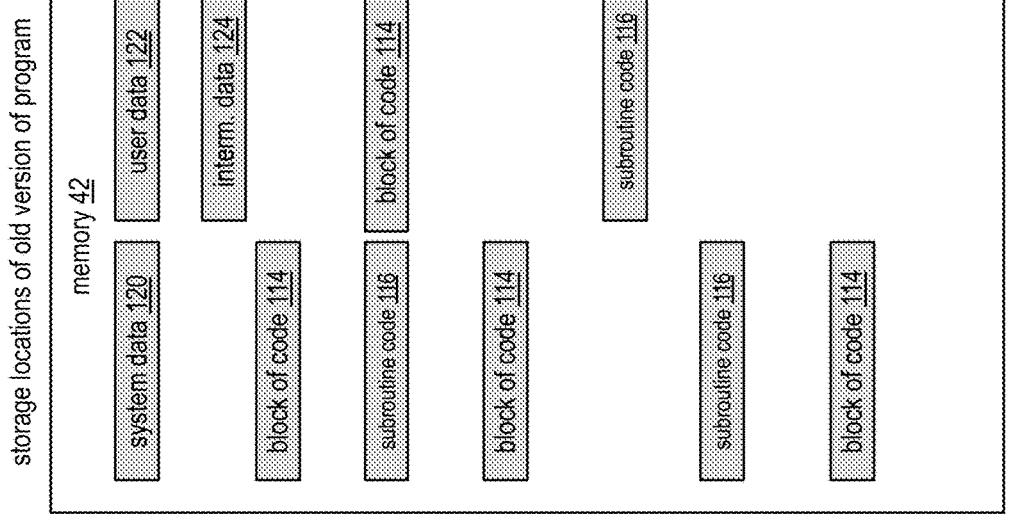
FIG. 17 is a schematic block diagram of an example of storing an application in memory of a computing device in accordance with the present invention.

FIG. 17 is a schematic block diagram of an example of storing an application (e.g., user application, system application, operating system, etc.), or portion thereof, in memory 42 of a computing device 24. The memory 42 includes a plurality of memory locations (e.g., terabytes or more) for storing data. Per the memory management function of the OS, different memory locations in the memory are used to store various data and operational instructions. For example, the system data 120, the user data 122, and/or the intermediate data 124 associated with the example program of FIG. 16 are each stored in one or more memory locations, which may or may not be contiguous.

As is also shown, the various blocks of code 114 and the subroutine blocks of code 116 are stored in a variety of memory locations throughout the memory 42. If malicious software has a beachhead in the computing device 24, it attempts to learn the memory structure for the program and/or to learn the memory management function of the OS.

Figure 18:
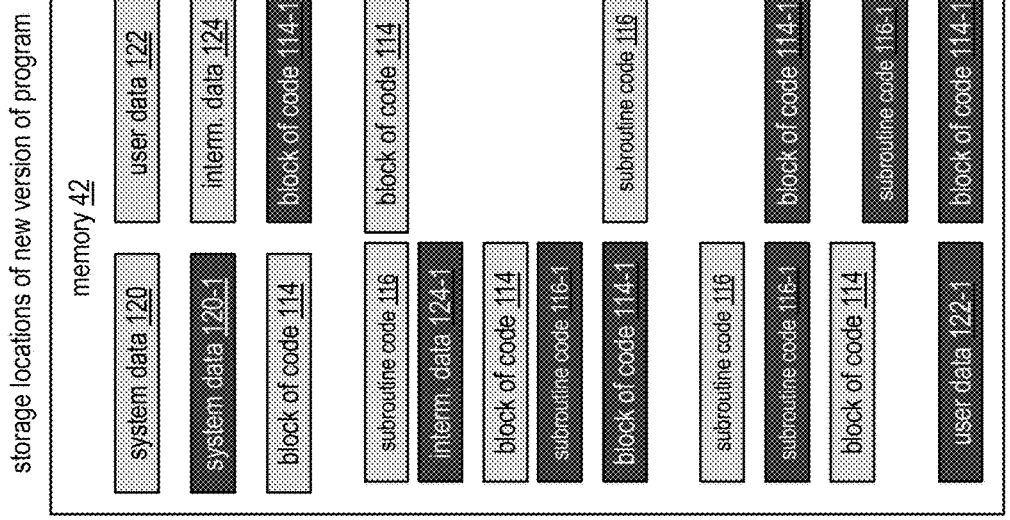
FIG. 18 is a schematic block diagram of an example of storing a new version of an application in memory of a computing device in accordance with the present invention.

FIG. 18 is a schematic block diagram of an example of storing a new version of the application of FIG. 17 in memory 42 of a computing device 24. In this instance, the new version of the application, or portions thereof, are stored in different memory locations in the memory than their corresponding older version. In addition, the memory management function of the OS may be part of what is changed to further vary how the new version of the application, or portions thereof, are stored in memory 42.

The old version of the application, or portion thereof, may be passively erased (e.g., removed from memory map and eventually overwritten by other data or operational instructions) or actively erased (e.g., deleting using a shredding program or the like). By storing a new version of the application, or portions thereof, in memory in different memory locations (and possibly using a different version of the memory managing function of the OS), the learning of the application that malicious software may have acquired is rendered substantially meaningless.

While the present example has shown that the new version of the application, or portions thereof, are stored in different memory locations than their corresponding older version(s), one or more of the portions of the application may overwrite its corresponding older version. Additional examples of storing the application or portions thereof to circumvent malicious software's intent to learn the application, the software structure, and/or the hardware structure can readily be derived from the examples presented.

Figure 19:
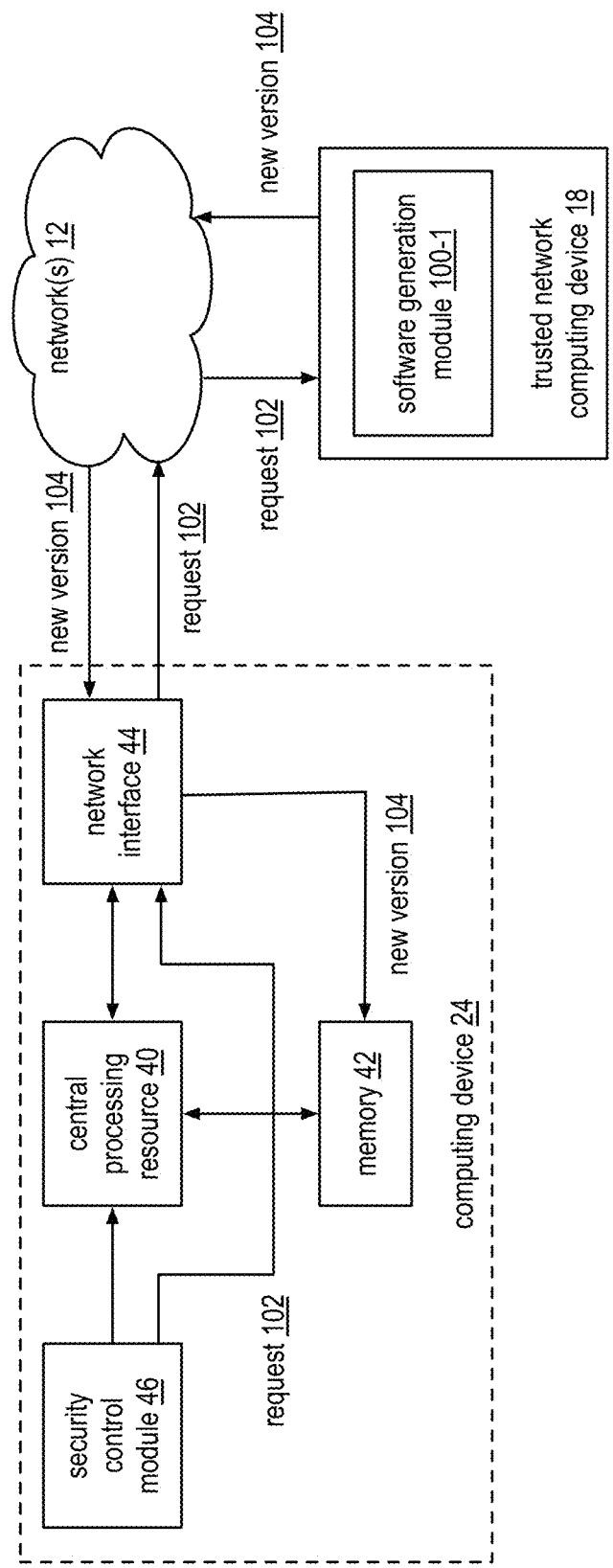
FIG. 19 is a schematic block diagram of an example of obtaining a new version of an application by a computing device in accordance with the present invention.

FIG. 19 is a schematic block diagram of an example of obtaining a new version 104 of an application by a computing device 24. The computing device 24 includes the central processing resource 40, the memory 42, the network interface 44, and the security control module 46. The trusted network computing device 18 includes a software generation module 100-1. In this embodiment, when the security control module 46 determines that a program, or portion thereof is to be changed, it sends a request 102 to the software generation module 100-1, via the network interface 44 and the network 12, to generate the new version of the program, or portion thereof. The request includes a network address of the software generation module 100-1 and may further include input requirements for the program, or portion thereof.

The software generation module 100-1 uses the input requirements to generate application requirements, which the software generation module uses to generate the new version of the at least a portion of the program. The input requirements include, but are not limited to, one or more if-then-else statements, one or more state table(s), one or more message sequence charts (e.g., MSC), and/or another agreed up format. The software generation module 100-1 includes software creation tools to convert the input requirements into one or more blocks of code as described in co-pending patent application entitled, "SYSTEM AND METHOD FOR GENERATING APPLICATION CODE", having a filing date of Aug. 30, 2011, an application Ser. No. 13/221,595, now U.S. Pat. No. 8,972,928.

Prior to sending the request and/or after receiving the new version of the application, or portions thereof, the security control module 46 authenticates the trusted network computing device 18 (which may be a network host that provides code generation services). The authentication may be done in a variety of ways. For example, the request and a subsequent response include signed certificates. As another example, the request and subsequent response are encrypted using public-private key pairs of the computing device 24 and the trusted network computing device 18. As yet another example, the security control module 46 is a registered user of the trusted network computing device 18 and performs a login procedure to request the new version of the application, or portion thereof, and/or to receive the new version of the application, or portion thereof.

Figure 20:
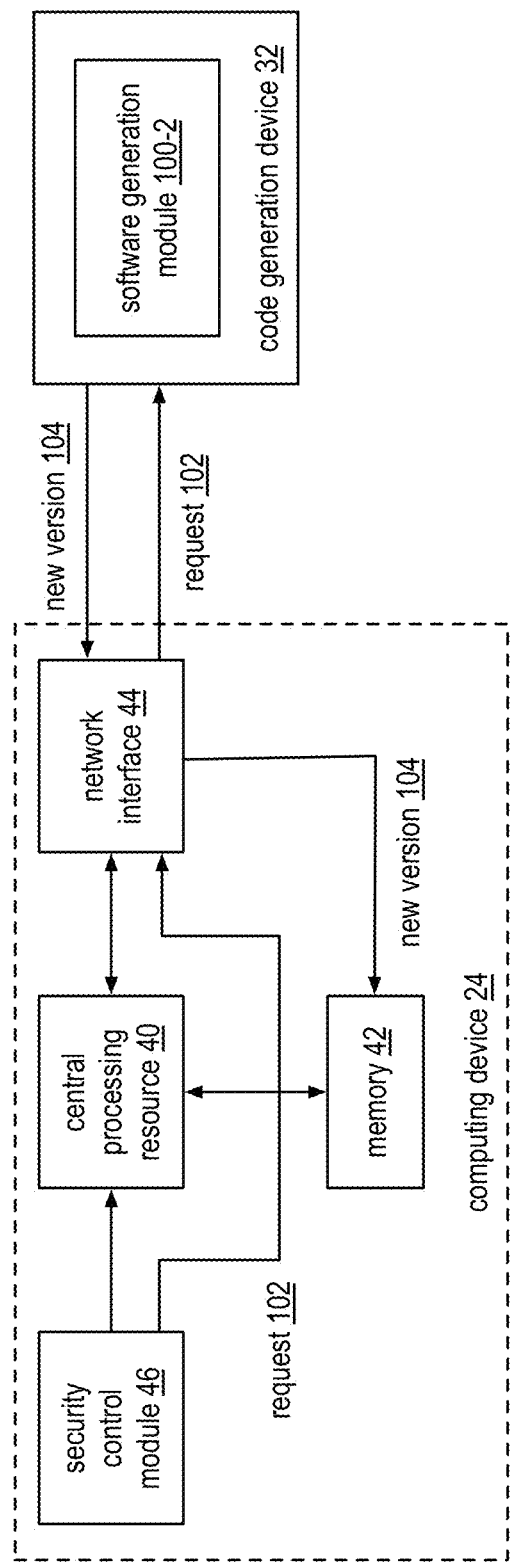
FIG. 20 is a schematic block diagram of another example of obtaining a new version of an application by a computing device in accordance with the present invention.

FIG. 20 is a schematic block diagram of another example of obtaining a new version 104 of an application by a computing device 24. The computing device 24 includes the central processing resource 40, the memory 42, the network interface 44, and the security control module 46. The code generation device 32 includes a software generation module 100-2. In this embodiment, when the security control module 46 determines that a program, or portion thereof is to be changed, it sends a request 102 to the code generation device 32, via the network interface 44 and the local area network, to generate the new version of the program, or portion thereof. The request includes a LAN address of the code generation device 32 and may further include input requirements for the program, or portion thereof.

The software generation module 100-2 uses the input requirements to generate application requirements, which the software generation module uses to generate the new version of the at least a portion of the program. The input requirements include, but are not limited to, one or more if-then-else statements, one or more state table(s), one or more message sequence charts (e.g., MSC), and/or another agreed up format. The software generation module 100-2 includes software creation tools to convert the input requirements into one or more blocks of code as described in co-pending patent application entitled, "SYSTEM AND METHOD FOR GENERATING APPLICATION CODE", having a filing date of Aug. 30, 2011, an application Ser. No. 13/221,595, now U.S. Pat. No. 8,972,928.

Figure 21:
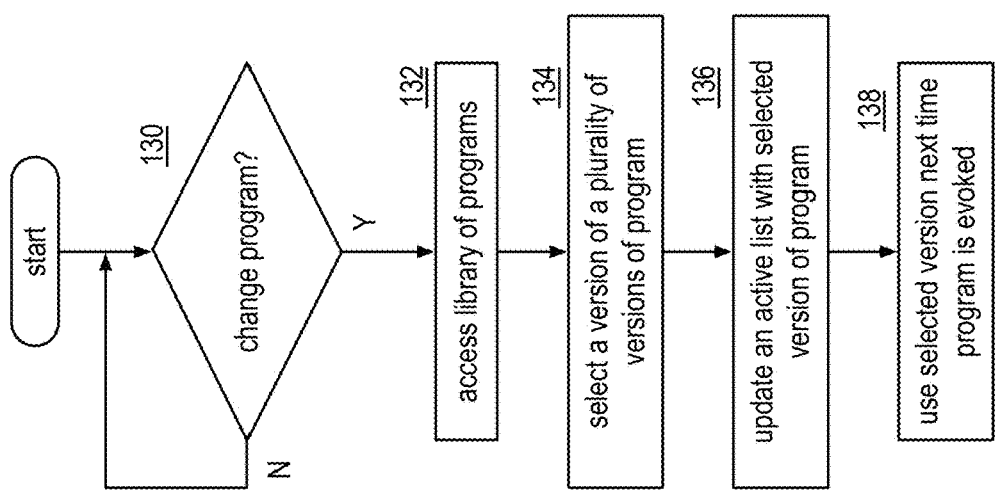
FIG. 21 is a logic diagram of another example of a method of securing a computing device in accordance with the present invention.

FIG. 21 is a logic diagram of another example of a method of securing a computing device 24 that begins at step 130 where the software control module 46 determines to change a program, or portion thereof, for security purposes (e.g., thwart effectiveness of malicious software that has circumvented anti malicious software algorithms and has entered the computing device). The program may be an operating system (OS) that includes a plurality of OS functions, a user application that includes a plurality of user application functions, or a system application that includes a plurality of system application functions.

The OS functions include process management, interrupts, device management, networking, memory management, file system, security, and input/output management. Each of the OS functions may include one or more OS function sub-routines and wherein a portion of the OS includes an OS function or an OS function sub-routine. A user application function includes one or more user application function sub-routines, where a portion of the user application includes the user application function or a user application function sub-routine. A system application function includes one or more system application function sub-routines, wherein a portion of the system application includes the system application function or a system application function sub-routine.

The decision as to which program to change and/or when to change it, or portion thereof, may be done in a variety of ways. For example, the security control module 46 may use a pseudo random sequence to identify, at pseudo random time intervals, the program, or portion thereof, from a plurality of programs. For instance, each interval of the pseudo random sequence identifies a different program of the plurality of programs, where the pseudo random sequence repeats at a cycle once a day, once a week, once a month, etc. such that each program, or portion thereof, is changed at least once in the repeating cycle.

As another example, the security control module 46 determines to change the program, or portion thereof, when the program has been evoked a predetermined number of time or a pseudo random number of times. For instance, every tenth evoking (e.g., opening, use, etc.) of the program, it, or a portion thereof, is changed. The number, whether fixed or pseudo random, the number is selected to minimize the malicious software's ability to learn about the program. As yet another example, the security module 46 may receive a command from a trusted management device 18 that identifies the program, or portion thereof, and when it is to be changed (e.g., now, within the next 24 hours, when it has been evoked a number of times, etc.).

As a further example, the security control module 46 determines to change the program, or portion thereof, when the program is operating outside of anticipated normal operating parameters. For instance, the security control module 46 tracks a program's performance characteristics (e.g., speed of execution, error rate, crashing, memory consumption, frequency of evoking, etc.) and, when the performance characteristics deviate from normal levels (e.g., deviate by a few percent or more), the security control module 46 determines to change the program, or portion thereof.

The method continues at step 132 where the security control module 46 access a library of programs that includes a plurality of versions of program when the program is to be changed and accesses the library of programs that includes a plurality of versions of portions of the program. The library of programs may be stored locally as will be discussed in greater detail with reference to FIG. 22; the library of programs may be stored in a code generation module 32 of a local area network; and/or stored in a trusted network computer device 18 as will be discussed in greater detail with reference to FIG. 25.

The method continues at step 134 where the security control module 46 selects a version of the program, or portion thereof, from the library of programs. This may be done in a variety of ways. For example, the security control module 46 selects a new version of an application, or portion thereof, from a plurality of versions of application programs and using a currently active operation system program. As such, each version of the application is written to function on the current operating system. As another example, the security control module 46 selects a new version of an operation system program from a plurality of versions of operating systems. As yet another example, the security control module selects the new version of the application program from the plurality of versions of application programs and selects the new version of the operating system program from the plurality of versions of operating systems.

The method continues at step 136 where the security control module 46 updates an active program list to include the selected version of the program, or portion thereof. The method continues at step 136 where, when the program is evoked, the central processing resource uses the selected version of the program, or portion thereof, such that execution of the program is changed, which changes internal operation of the computing device thereby reducing adverse impact of the malicious software.

Figure 22:
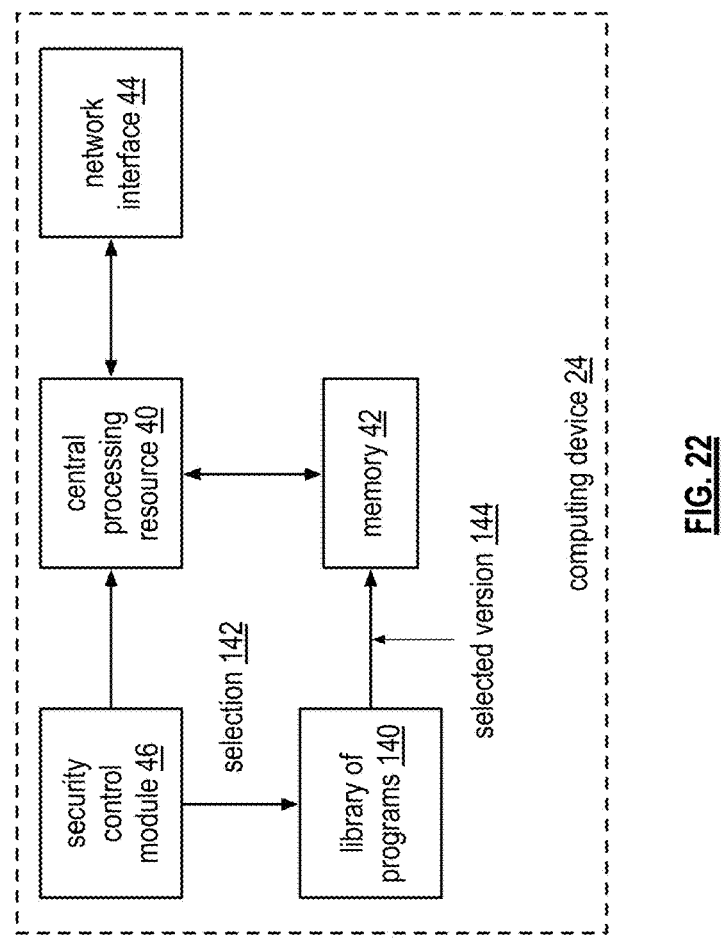
FIG. 22 is a schematic block diagram of another embodiment of a computing device in accordance with the present invention.

FIG. 22 is a schematic block diagram of another embodiment of a computing device 24 that includes the central processing resource 40, the memory 42, the network interface 44, the security control module 46, and a library of programs, or portions thereof, 140. In this embodiment, when the security control module 46 determines that a program, or portion thereof is to be changed, it accesses the library of programs 140, which may stored in the memory 42 of the computing device or in other memory of the computing device not visible to the user and network interface 44 of the computing device 24.

The security control module 46, having identified the program, or portion thereof, and the new version of the program, or portion thereof, retrieves the new version and stores it in memory 42 as described with reference to FIG. 18. The security control module 46 may actively or passively erase the older version of the program or portion thereof. Note that the library of programs, or portions thereof, may have a limited number of versions for each program, or portion thereof; as such, a new version may be a previously used version, where the selection is done in a round robin manner of the limited number of versions. Alternatively, a code generation module may continue to create new versions of the program, or portion thereof, which are added to the library to broaden the choices for selecting a new version.

Figure 23:
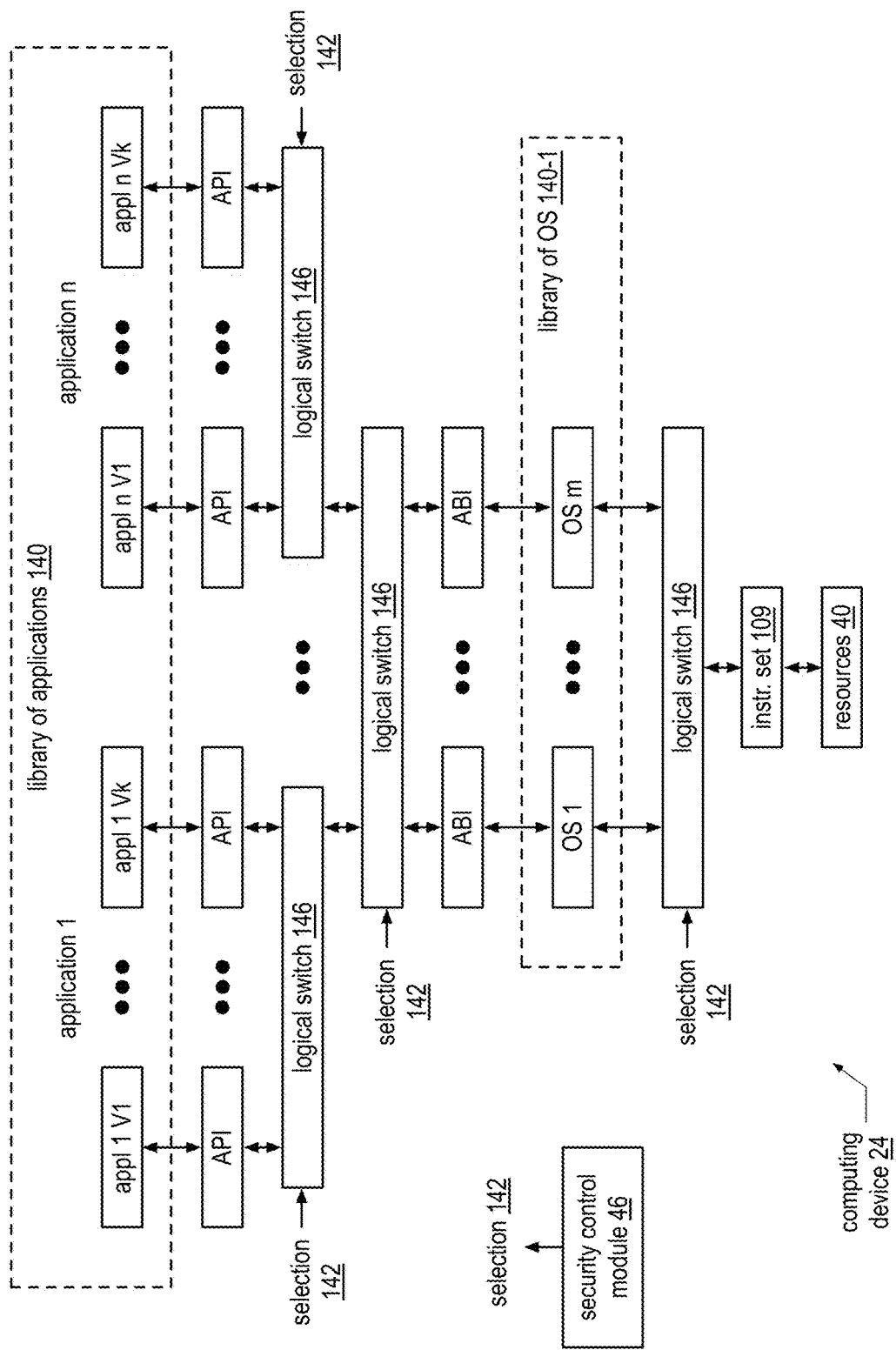
FIG. 23 is a schematic block diagram of another embodiment of a computing device in accordance with the present invention.

FIG. 23 is a schematic block diagram of another embodiment of a computing device 24 that includes the central processing resource 40, the security control module 46, a library of applications 140, a plurality of APIs, a plurality of logical switches 146, a plurality of ABIs, a library of operating systems (OS) 140-1, and an instruction set 109. The library of applications 140 includes multiple versions of each application of a plurality of applications (e.g., 1 through n applications). For example, application 1 (e.g., a user application or a system application) includes versions V1 through Vk and application "n" includes versions 1 through k, where k is an integer greater than or equal to 2. Further, from application to application, the number of versions per application may be the same or different. For instance, the more sensitive the application, the more versions of the application are created.

Each version of an application may include a complete new version of the application or one or more new portions of the application. Alternatively, or in addition, the library of applications may include a library of versions of blocks of code of applications (e.g., a plurality of versions of the portions of each application). In this latter example, different combinations of versions of portions of the portions of the application may be selected to produce a new version of the application.

The library of operating systems 140-1 includes a plurality of versions of an operating system and/or a plurality of versions of portions of the operating system. For example, the library of operating systems 140-1 includes 1 through m versions of the operating system and/or 1 through m versions of portions of the operating system (e.g., process management, interrupts, device management, networking, memory management, file system, security, and IO functions).

The logical switches 146 may be logical constructs and/or switching networks. As a logical construct, a logical switch 146 may be implemented via software to keep track of which version of an application is selected and updating appropriate memory maps to access the selected version of the application.

In an example, one of the versions of an application is selected from the library 140. The logical switch 146, based on the selection 142, couples the API of the selected application to another logic switch 146 that couples the selected application to an ABI. The selected OS processes the selected application by issuing OS operational instructions via another logical switch 146 to the central processing resource 40 via the instruction set. Note that several versions of the OS may be selected to support several selected versions of applications. In this instance, one or more of the selected OS's would perform the process management regarding use of the central processing resource 40.

In another example, from computing device to computing device, the respective security control modules select different versions of applications and/or different combinations of versions of application portions (e.g., blocks of code, subroutine blocks of code, etc.). In this example, each computing device functions similarly but uses different versions of the applications. Thus, if a virus or worm attacks a program in one computing device, its propagation to other computing devices and its ability to attack corresponding programs therein is substantially reduced due to the different versions.

Figure 24:
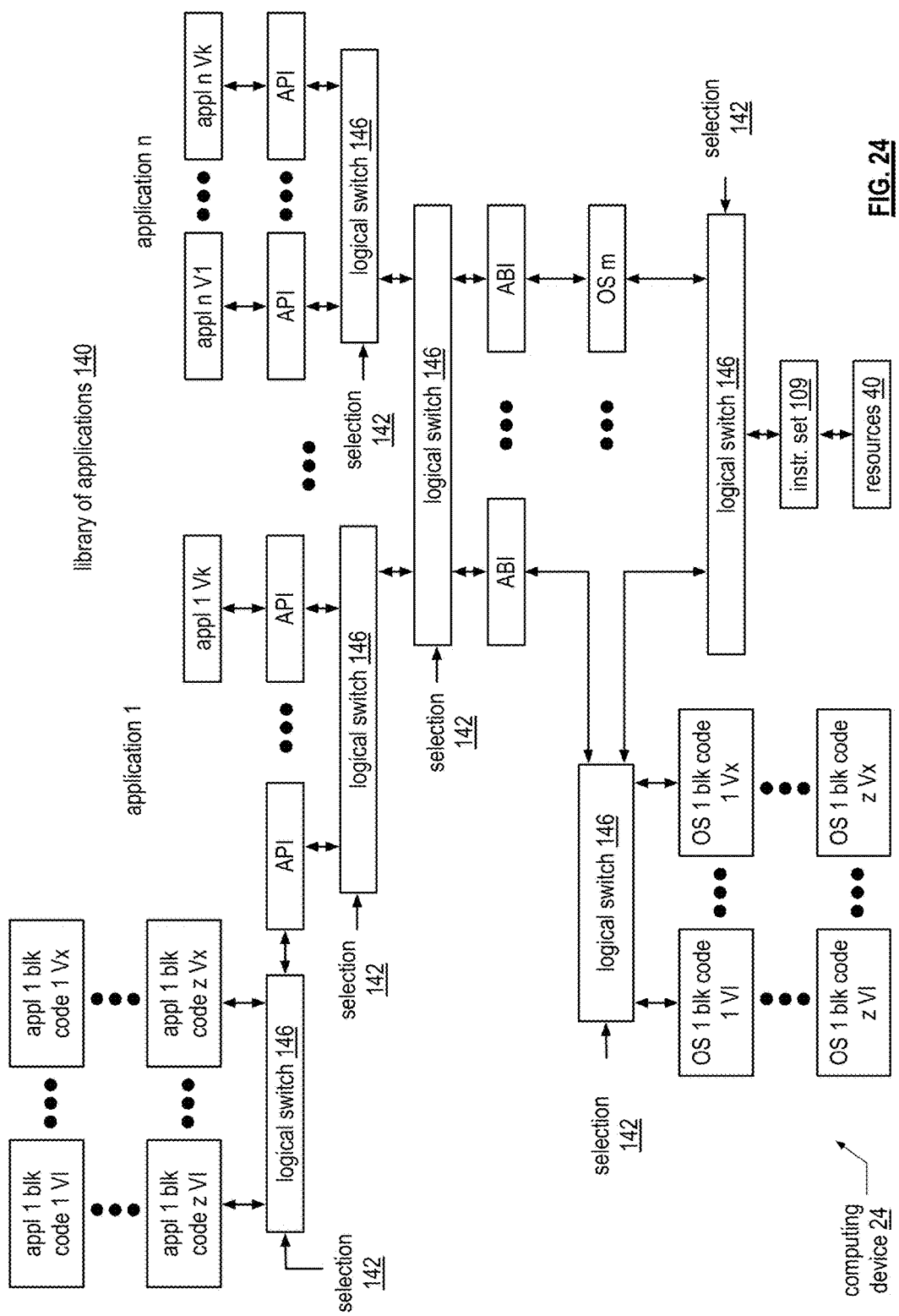
FIG. 24 is a schematic block diagram of another embodiment of a computing device in accordance with the present invention.

FIG. 24 is a schematic block diagram of another embodiment of a computing device 24 that includes the central processing resource 40, the security control module 46, a library of applications 140, a plurality of APIs, a plurality of logical switches 146, a plurality of ABIs, a library of operating systems (OS) 140-1, and an instruction set 109. The library of applications 140 includes multiple versions of a plurality of sections for one or more applications of a plurality of applications (e.g., 1 through n applications). For example, application 1 (e.g., a user application or a system application) includes a plurality of blocks of code, each with versions V1 through Vk. The library 140 also includes one or more applications that include a plurality of version of the application (e.g., application "n"), which includes versions 1 through k, where k is an integer greater than or equal to 2. The other applications of the library 140 may include a plurality of versions of the application and/or a plurality of versions of a plurality of blocks of code of the application. Further, from application to application, the number of versions per application, and number of versions of blocks of code, may be the same or different. For instance, the more sensitive the application, the more versions of the application, and/or versions of blocks of code, are created.

The library of OS's 140-1 includes a plurality of versions of an OS. One or more of the versions includes multiple versions of a plurality of portions (e.g., functions and/or sub-functions) of the OS (e.g., blocks 1-z, with versions 1-x of each block). Other versions of the OS include complete different versions.

In an example, if application 1 is to be changed, the security control module 46 may select different versions for the various blocks. For example, the security control module 46 may select version 1 of block of code 1, version 2 for block of code 2, and so on. The next time application 1 is to be changed, the security control module 46 selects a new combination of blocks of code. For example, the security control module 46 may select version 4 of each of the plurality of blocks of code (1-z). The security control module 46 may make similar selections for the various versions of the blocks of code for a version of the operating system.

Figure 25:
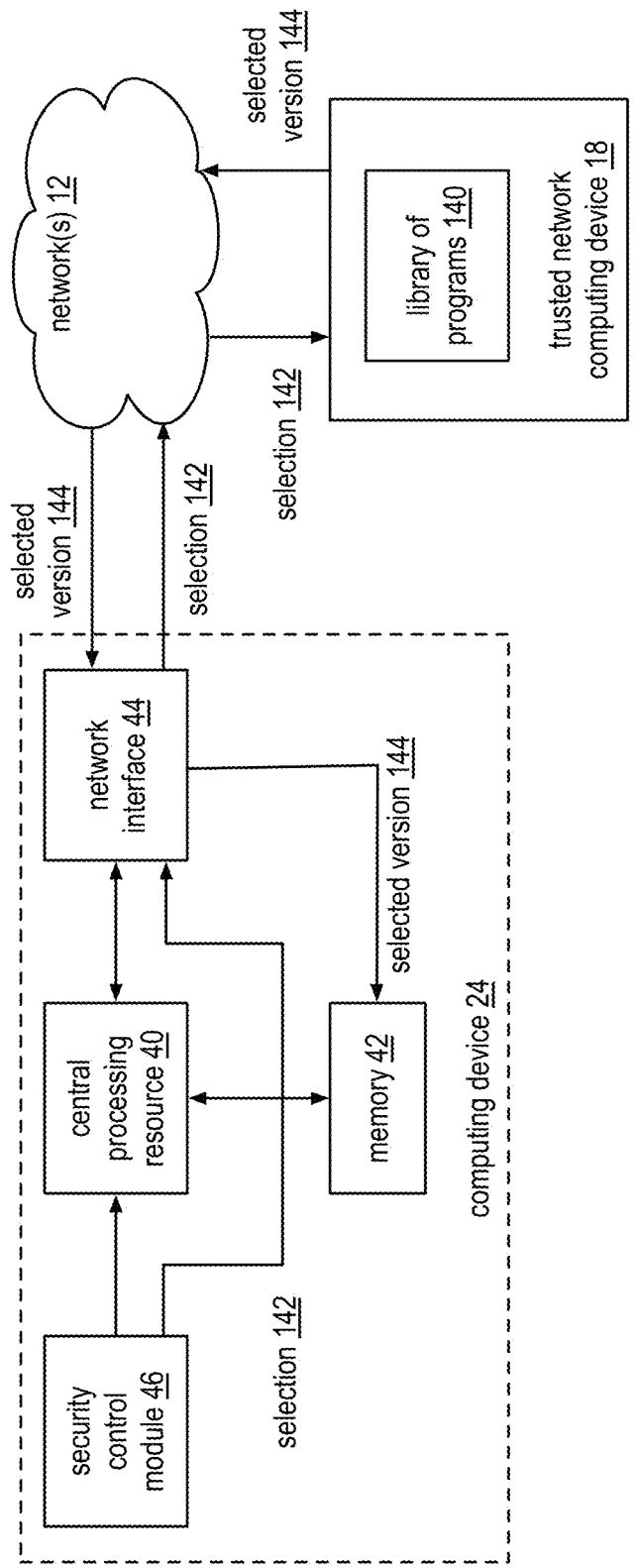
FIG. 25 is a schematic block diagram of another example of obtaining a new version of an application by a computing device in accordance with the present invention.

FIG. 25 is a schematic block diagram of another example of obtaining a new version of an application by a computing device 24 from a trusted network computing device 18. The computing device 24 includes the central processing resource 40, memory 42, the network interface 44, and the security control module 46. The trusted network computing device 18 includes the library of applications 140 and may further include the library of OS 140-2. In this embodiment, when the security control module 46 determines that a program, or portion thereof is to be changed, it sends a selection request 142 to the trusted network computing device 18, via the network interface 44 and the network 12, to receive a different version of the program, or portion thereof, (e.g., user application, system application, OS). The request includes a network address of the trusted network computing device 18 and/or of the library of programs 140.

In response to the request, the trusted network computing device 18 selects a version of an application or portion thereof and sends the selected version 144 back to the computing device 24. The computing device 24 stores the selected version 144 of the application or portion thereof as previously discussed with reference to FIGS. 17 and 18.

Prior to sending the request and/or after receiving the selected version of the application, or portions thereof, the security control module 46 authenticates the trusted network computing device 18 (which may be a network host that provides code generation services). The authentication may be done in a variety of ways. For example, the request and a subsequent response include signed certificates. As another example, the request and subsequent response are encrypted using public-private key pairs of the computing device 24 and the trusted network computing device 18. As yet another example, the security control module 46 is a registered user of the trusted network computing device 18 and performs a login procedure to request the selected version of the application, or portion thereof, and/or to receive the selected version of the application, or portion thereof.

Figure 26:
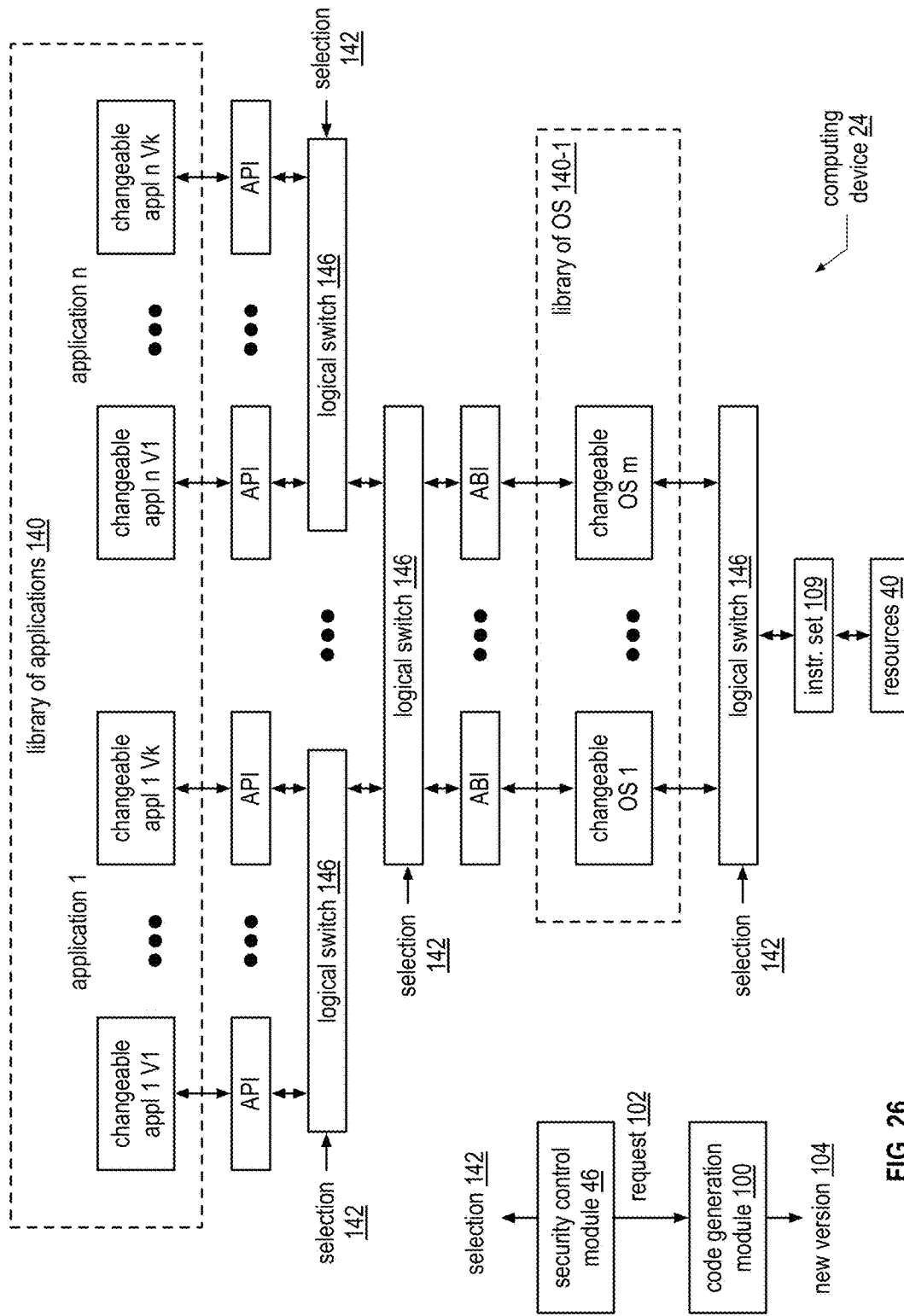
FIG. 26 is a schematic block diagram of another embodiment of a computing device in accordance with the present invention.

FIG. 26 is a schematic block diagram of another embodiment of a computing device 24 that includes the central processing resource 40, the security control module 46, a library of changeable applications 140, a plurality of APIs, a plurality of logical switches 146, a plurality of ABIs, a library of changeable operating systems (OS) 140-1, and an instruction set 109. The library of changeable applications 140 includes multiple versions of each application of a plurality of applications (e.g., 1 through n applications), and each version of each application may be changed as discussed above. In this manner, the library includes multiple versions of an application and, as time goes on, the versions are changed such that only one version of an application may be used for a given duration.

The library of OS's 140-1 includes a plurality of changeable versions of an OS, or of a plurality of OSs. One or more of the versions includes multiple versions of a plurality of portions (e.g., functions and/or sub-functions) of the OS (e.g., blocks 1-z, with versions 1-x of each block). Other versions of the OS include complete different versions. The versions of the OS, or portions thereof, may be changed as previously discussed.

FIG. 27 is a logic diagram of another example of a method of securing a computing device 24 that begins at step 150 where the security control module determines to change operation of a program, or portion thereof, of the computing device. Such a determination may be done in a variety of ways as were discussed with reference to step 130 of FIG. 21. When the operation of the program, or portion thereof, is to be changed, the method continues at step 152 where the security control module 46 identifies a first processing resource of the central processing resources that is currently assigned to execute the program, or portion thereof.

The method continues at step 154 where the security control module 46 selects a second processing resource of the central processing resources for subsequent execution the program, or portion thereof. For example, the first processing resource includes a first central processing unit (CPU) of a plurality of CPUs and a first operating system (OS) of the plurality of OSs and the second processing resource includes a different one or more CPUs and a different one or more OSs. The program is a user application, or portion thereof, and/or a system application, or portion thereof.

The method continues at step 156 where the security control module 46 ascertains (e.g., look up, special mapping built into the OS, communication with active OS, etc.) first execution settings of the program as used by the first processing resource. The first execution settings includes one or more of memory management information (e.g., where program is stored, partitioning information, segmentation information, paging, virtual memory map, etc.) regarding the program as used by the first processing resource, file system information (e.g., directories, file names, file system functions, information types, etc.) regarding the program as used by the first processing resource, process management information (e.g., scheduling information, process state, process attributes, process supervisory calls, etc.) regarding the program as used by the first processing resource, security information (e.g., keys, passwords, encryption algorithm, authentication, identification, etc.) regarding the program as used by the first processing resource, and an instruction set type for the first processing resource.

The method continues at step 158 where the security control module 46 facilitates conversion of the first execution settings into second execution settings for the second processing resource. This may be in a variety of ways. For example, the security control module determines a difference between memory management function of the first processing resource and the second processing resource and converting, based on the memory management difference, memory management information regarding execution of the program by the first processing resource into memory management information regarding execution of the program by the second processing resource. As another example, the security control module determines a difference between file system management function of the first processing resource and the second processing resource and converting, based on the file system management difference, file system information regarding execution of the program by the first processing resource into file system information regarding execution of the program by the second processing resource.

As yet another example, the security control module determines a difference between process management function of the first processing resource and the second processing resource and converting, based on the process management difference, process management information regarding execution of the program by the first processing resource into process management information regarding execution of the program by the second processing resource. As a further example, the security control module determines a difference between security management function of the first processing resource and the second processing resource and converting, based on the security management difference, security information regarding execution of the program by the first processing resource into security information regarding execution of the program by the second processing resource. As a still further example, the security control module determines an instruction set type of the second processing resource and converting, based on the instruction set type of the second processing resource, operational instructions of the program into machine language for a processor of the second processing resource.

The method continues at step 160 where the security control module de-assigns the first processing resource from executing the program, or portion thereof, and assigns the second processing resource to execute the program, or portion thereof. In accordance with this method, the next time the program, or portion thereof, is evoked, a different central processing resource will execute the program, or portion thereof, such that execution of the program is changed, which changes internal operation of the computing device thereby reducing adverse impact of the malicious software.

FIG. 28 is a logic diagram of another example of a method of securing a computing device 24 that begins at step 150 where the security control module determines to change operation of a program, or portion thereof, of the computing device. Such a determination may be done in a variety of ways as were discussed with reference to step 130 of FIG. 21. The security control module may determine to change the program, or portion thereof, change the central processing resource assigned to execute the program, or portion thereof, or changing both the program, or portion thereof, and the central processing resource executing the program, or portion thereof.

When both the program, or portion thereof, and the execution of the program, or portion thereof, are to be changed, the method continues at step 172 where the security control module facilitates a change of the program, or portion thereof, to produce a changed program. The changing of a program may be done as previously discussed. The method continues at step 154 where, as discussed with reference to FIG. 27, the security control module selects a second processing resource of the central processing resources to execute the changed program.

The method continues at step 156, where, as discussed with reference to FIG. 27, the security control module ascertains first execution settings of the program as currently used by a first processing resource s for executing the program. The method continues at step 158 where, as discussed with reference to FIG. 27, the security control module facilitates conversion of the first execution settings into second execution settings for the second processing resource. The method continues at step 174 where the security control module de-assigns the first processing resource from executing the program, or portion thereof, and assigns the second processing resource to execute the changed program.

Figure 29:
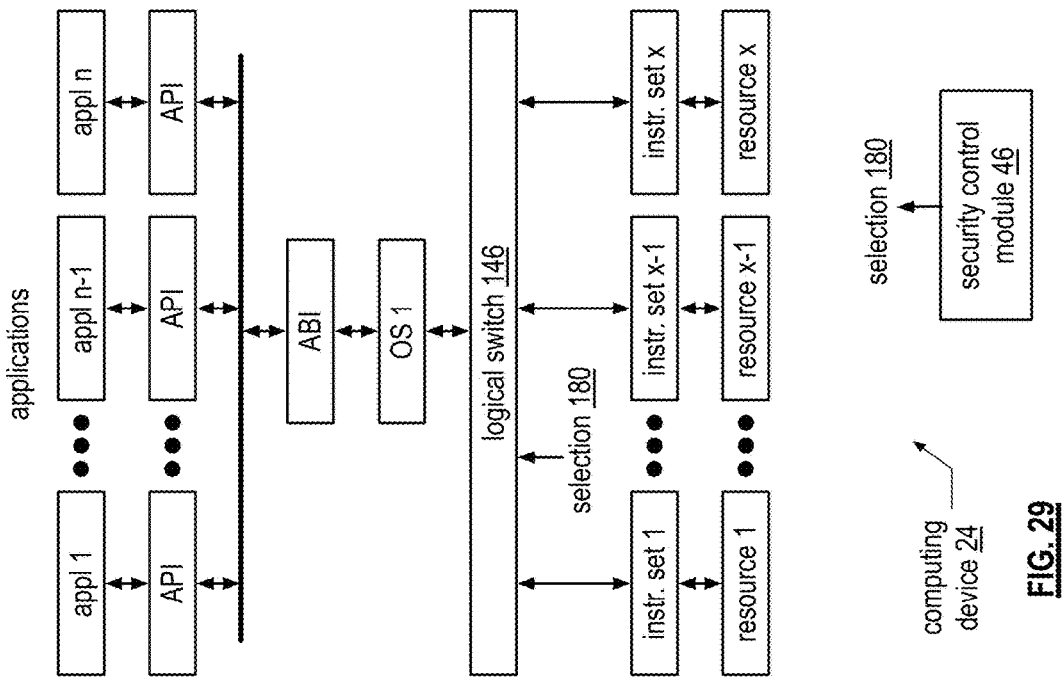
FIG. 29 is a schematic block diagram of another embodiment of a computing device in accordance with the present invention.

FIG. 29 is a schematic block diagram of another embodiment of a computing device 24 that includes a plurality of central processing resources (1-x), a plurality of corresponding instruction sets, a logical switch, an operating system (OS), an ABI, a plurality of APIs, and a plurality of applications (1-n). The security control module 46 generates a selection signal 180 that selects one of the central processing resources to execute an application, or portion thereof. For example, when the first application (e.g., #1) is opened (e.g., evoked), the security control module 46 may determine that central processing resource #2 will execute the application (i.e., execute all of the portions of the application).

As another example, when the first application is opened, the security control module 46 may determine that central processing resource #1 will execute a first set of portions of the application and central processing resource #2 will execute a second set of the portions of the application. As another example, the security control module may determine to change central processing resources of the application, or portions thereof, after the application has been opened for a predetermined period of time.

As a further example, the security control module 46 may determine that a first set of the applications is to be executed by a first central processing resource, a second set of the applications is to be executed by a second central processing resource, and so on. The assignment of a central processing resource to a set of applications may change over time, based on frequency of use, load balancing between the central processing resources, etc.

Figure 30:
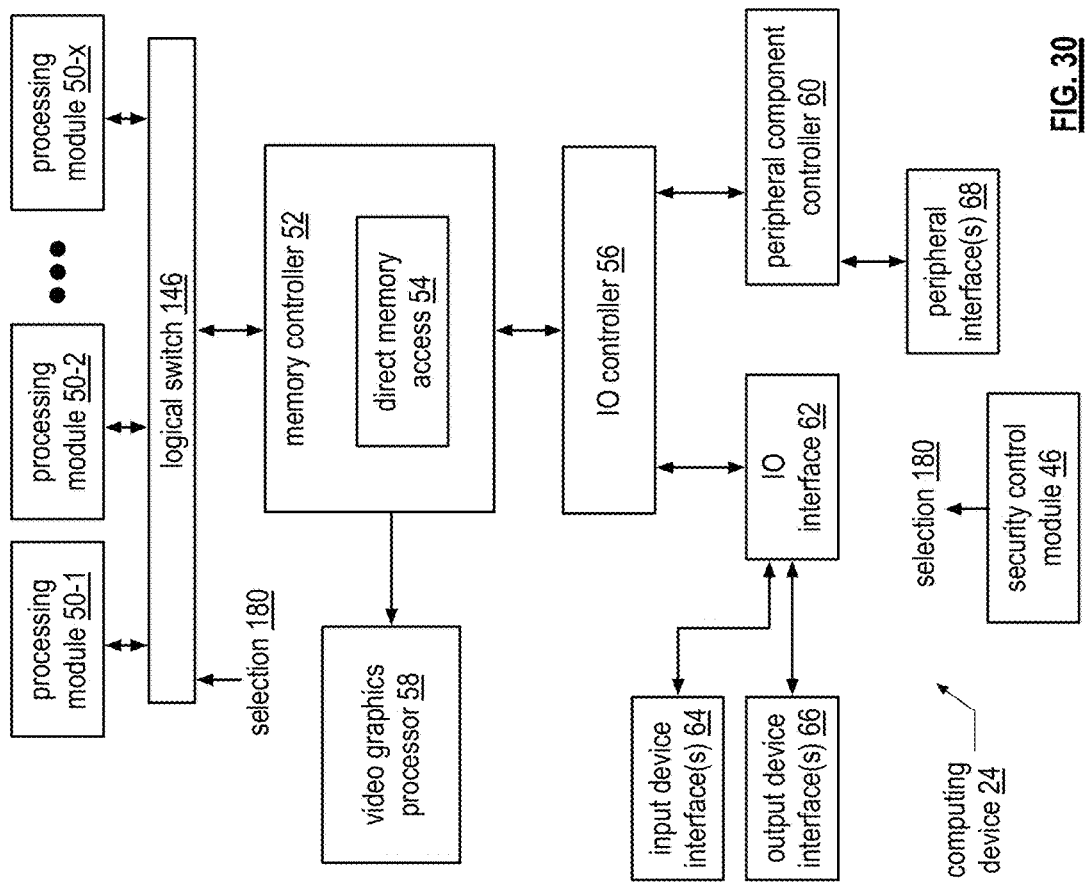
FIG. 30 is a schematic block diagram of another embodiment of a computing device in accordance with the present invention.

FIG. 30 is a schematic block diagram of another embodiment of a computing device 24 that includes a plurality of processing modules 50-1 through 50-x, a logical switch 146, a memory controller 52, a direct memory access module 54 (optional), an IO controller 56, a video graphics processor 58, a peripheral component controller 60, an IO interface 62, one or more input device interfaces 64, one or more output device interfaces 66, and one or more peripheral component interfaces 68. Each of the processing modules 50-1 through 50-x may be the same type of processing device, different types of processing devices, or a combination thereof.

In this embodiment, each of the plurality of central processing resources includes a different processing module and includes the same memory controller 52, IO controller 56, video graphics processor 58, the peripheral component controller 60, etc. For example, the first processing resource includes a first processing module 50-1 and the memory controller 52, the direct memory access module 54 (optional), the IO controller 56, the video graphics processor 58, the peripheral component controller 60, the IO interface 62, the one or more input device interfaces 64, the one or more output device interfaces 66, and the one or more peripheral component interfaces 68. As another example, the second processing resource includes a second processing module 50-2 and the memory controller 52, the direct memory access module 54 (optional), the IO controller 56, the video graphics processor 58, the peripheral component controller 60, the IO interface 62, the one or more input device interfaces 64, the one or more output device interfaces 66, and the one or more peripheral component interfaces 68.

Figure 31:
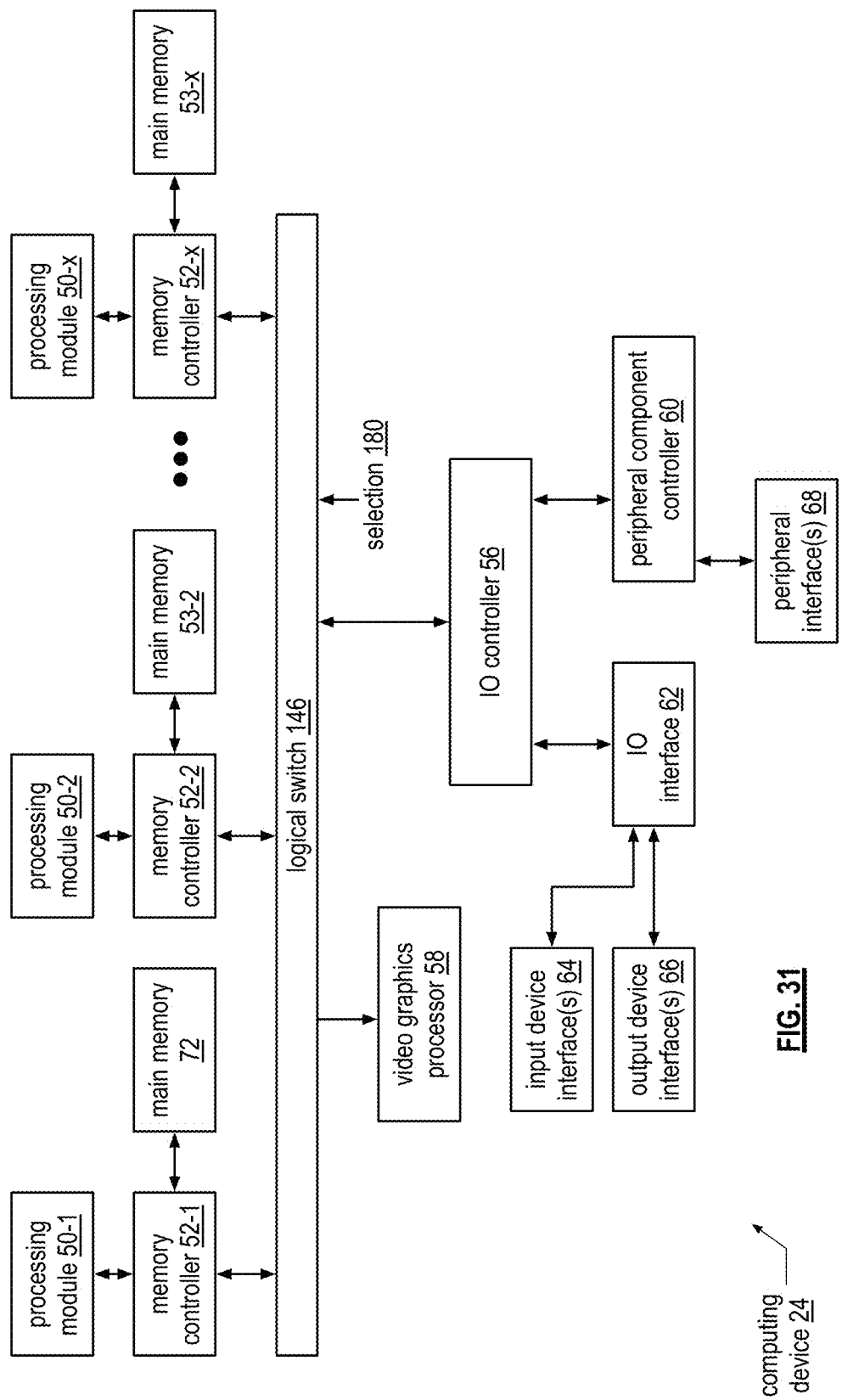
FIG. 31 is a schematic block diagram of another embodiment of a computing device in accordance with the present invention.

FIG. 31 is a schematic block diagram of another embodiment of a computing device 24 that includes a plurality of processing modules 50-1 through 50-x, a plurality of memory controllers 52-1 through 52-x, a plurality of main memories 72, and 53-2 through 53-x (which are additional memories of the central processing resources), a logical switch 146, the IO controller 56, the video graphics processor 58, the peripheral component controller 60, the IO interface 62, the one or more input device interfaces 64, the one or more output device interfaces 66, and the one or more peripheral component interfaces 68. Each of the processing modules 50-1 through 50-x may be the same type of processing device, different types of processing devices, or a combination thereof; each of the memory controllers 52-1 through 52-x may be the same type of memory controller, different types of memory controllers, or a combination thereof; and each of the main memories may be of the same size and type of memory, of different sizes and the same type of memories, of different sizes and different types of memories, or a combination thereof.

In this embodiment, each of the plurality of central processing resources includes a different set of processing module, memory controller, and main memory and includes the same IO controller 56, video graphics processor 58, the peripheral component controller 60, etc. For example, the first processing resource includes a first set of processing module 50-1, memory controller 52-1 and main memory 72 and also includes the IO controller 56, the video graphics processor 58, the peripheral component controller 60, the IO interface 62, the one or more input device interfaces 64, the one or more output device interfaces 66, and the one or more peripheral component interfaces 68. As another example, the second processing resource includes a second set of the processing module 50-2, the memory controller 52-2, and main memory 53-2 and further includes the IO controller 56, the video graphics processor 58, the peripheral component controller 60, the IO interface 62, the one or more input device interfaces 64, the one or more output device interfaces 66, and the one or more peripheral component interfaces 68.

FIG. 32 is a schematic block diagram of another embodiment of a computing device 24 includes the security control module 46, a plurality of central processing resources 1-x, a plurality of corresponding instruction sets 1-x, a first logic switch 146, a plurality of operating systems (OS), or versions thereof, a plurality of corresponding ABIs, a second logical switch 146, a plurality of applications 1-n, or versions thereof, and a plurality of corresponding APIs. In this embodiment, the security control module 46 generates a selection 182 to select an application, or portion thereof, an operating system, or portion thereof, (or a version of an operating system, or portion thereof), and a central processing resource.

FIGS. 33-35 are schematic block diagrams of an example of changing processing resources of the computing device 24 of FIG. 32. In FIG. 33, the security control module 46 has selected a first application, a first operating system, and a first central processing resource as illustrated by the gray filled boxes. At some point, the security control module 46 determines to change the execution of the program. In this example, the security control module 46 determines to change the central processing resource assigned to execute the first application and first operating system. As shown in FIG. 34, the security control module 46 has selected the second central processing resource to execute the first application and the first operating system.

At some later point in time, the security control module 46 determines to again change the execution of the program. In this example, the security control module 46 determines to change the operating system. As shown in FIG. 35, the security control module 46 has selected the second operating system and has not changed the previous selection of the first application and the second central processing resource.

Figure 36:
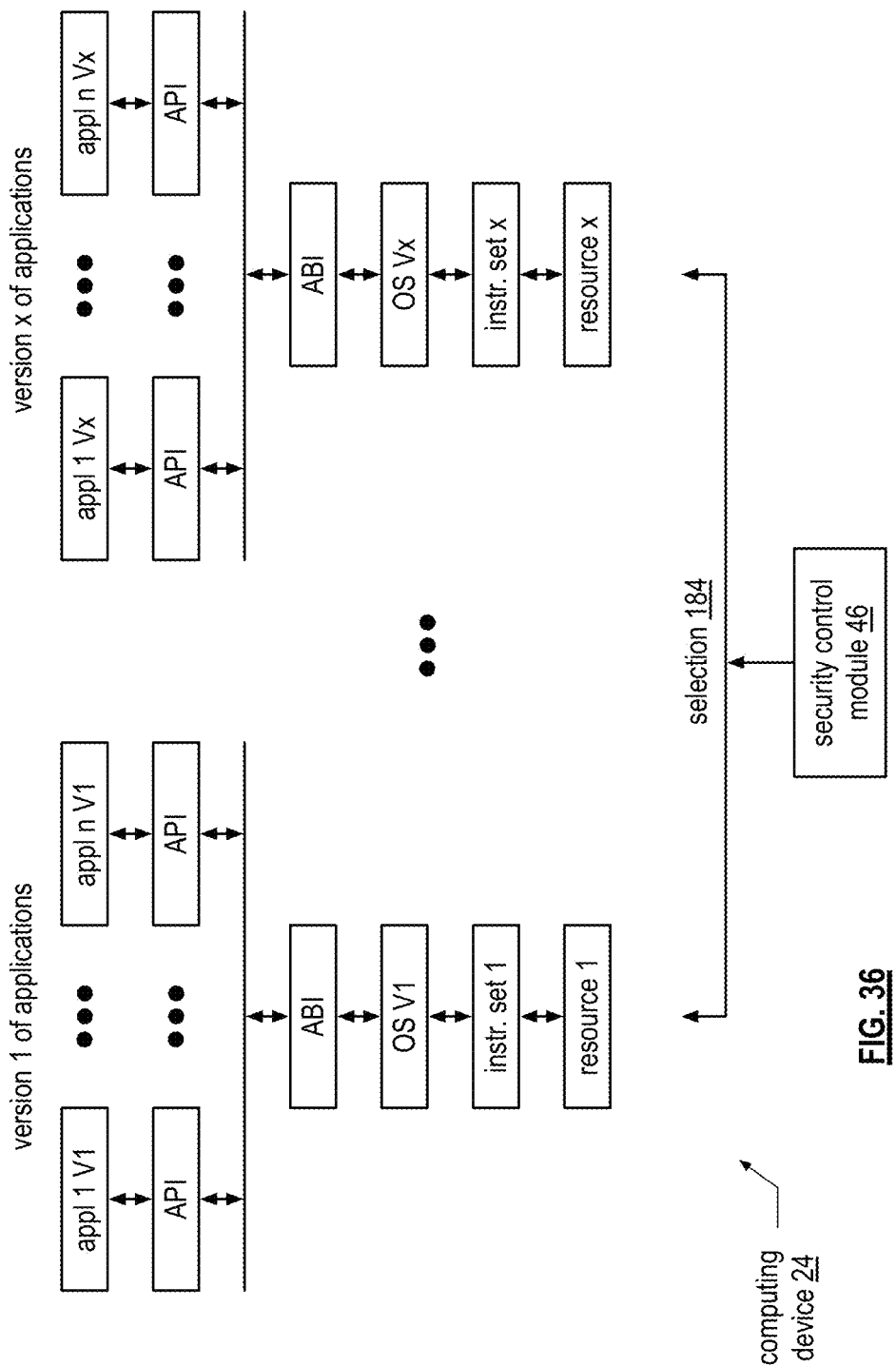
FIG. 36 is a schematic block diagram of another embodiment of a computing device in accordance with the present invention.

FIG. 36 is a schematic block diagram of another embodiment of a computing device 24 that includes the security control module 36 and a plurality of set of a plurality of a version of applications, an operating system, a central processing resource, a plurality of corresponding APIs, and an ABI. For example, a first set includes a plurality of first versions of a plurality of applications (e.g., appl 1 V1 through appl n V1), a first plurality of APIs, a first ABI, a first OS (or a first version of an OS) (e.g., OS V1), a first instruction set, and a first central processing resource. As another example, a second set includes a plurality of second versions of a plurality of applications (e.g., appl 1 V2 through appl n V2), a second plurality of APIs, a second ABI, a second OS (or a second version of an OS) (e.g., OS V2), a second instruction set, and a second central processing resource.

In an example of operation, the security control module 46 makes a selection 46 of a version of an application to be executed. The selection dictates the set that will be used. For example, if the security control module 46 selects 184 the first version of an application, then the first OS and the first central processing resource are selected. Note that the security control module 46 may select different sets for different portions of an application. For instance, the security control module 46 selects the first set to support a first portion of a first application and selects the second set to support a second portion of the first application.

Figure 37:
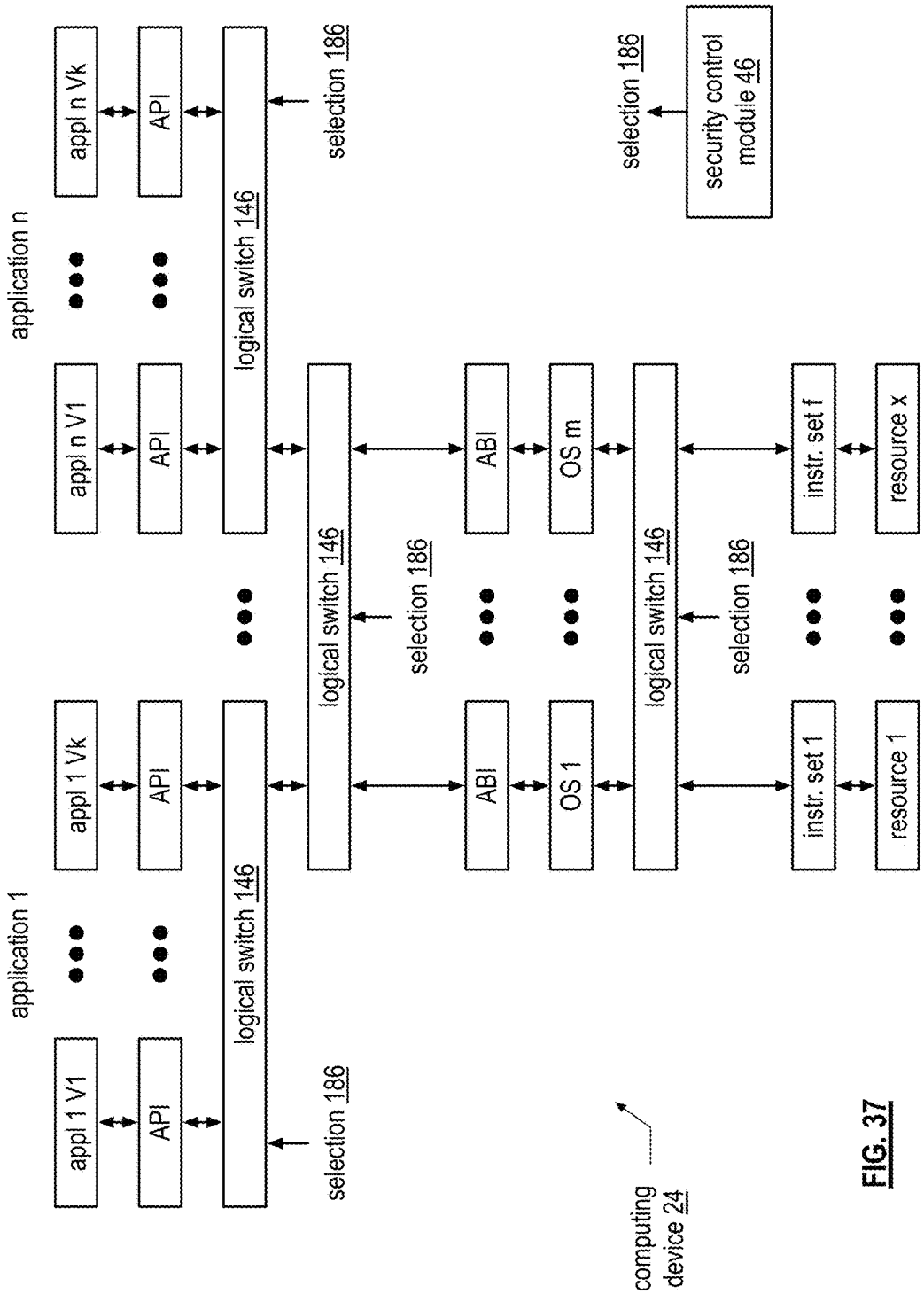
FIG. 37 is a schematic block diagram of another embodiment of a computing device in accordance with the present invention.

FIG. 37 is a schematic block diagram of another embodiment of a computing device 24 that includes a plurality of versions of a plurality of applications, a plurality of corresponding APIs, a series of logical switches 146, a plurality of ABIs, a plurality of operating systems (or a plurality of versions of an operating system), a plurality of instruction sets, and a plurality of central processing resources. In this embodiment, the security control module 46 may select 186 a version of an application, an operating system (or an operating system version) to support the application, and a central processing resource to support the selected application and the selected operating system (or selected operating system version). As such, any version of an application can run on any operating system (or operating system version) and on any of the central processing resources.

Figure 38:
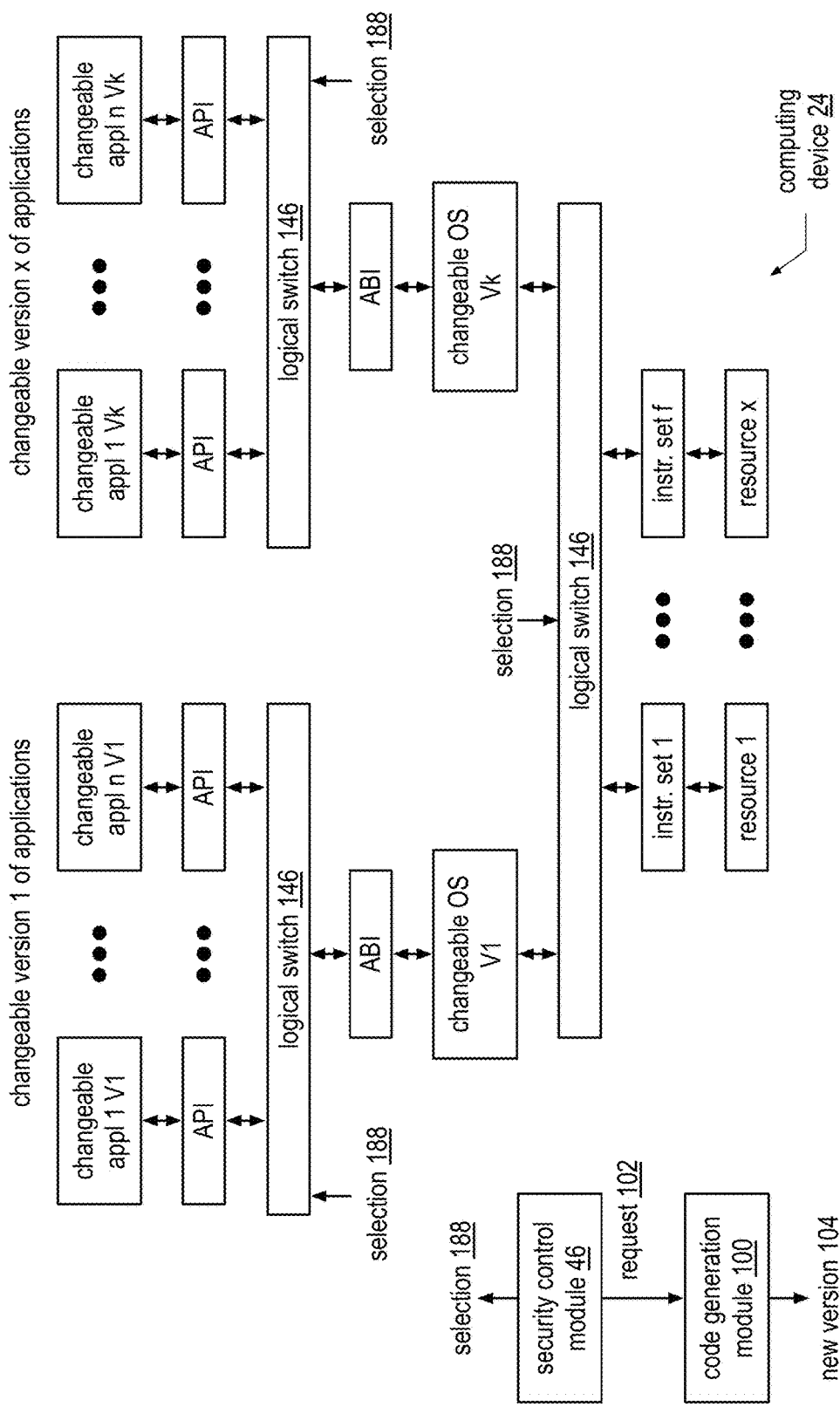
FIG. 38 is a schematic block diagram of another embodiment of a computing device in accordance with the present invention.

FIG. 38 is a schematic block diagram of another embodiment of a computing device includes a plurality of changeable versions of a plurality of applications, a plurality of corresponding APIs, a series of logical switches 146, a plurality of ABIs, a plurality of changeable operating systems (or a plurality of changeable versions of an operating system), a plurality of instruction sets, and a plurality of central processing resources. In this embodiment, the security control module 46 may select 186 a version of an application, an operating system (or an operating system version) to support the application, and a central processing resource to support the selected application and the selected operating system (or selected operating system version). The security control module 46 may further elect to change a version of an application, portion thereof, an operating system, or a portion thereof, or a combination thereof. As such, any version of an application can be changed and run on any operating system (or operating system version), which can also be changed, and on any of the central processing resources.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a security control module to reduce adverse impact of malicious software in a computing device, the method comprises:
   determining, based on a selected security request, whether to change operation of a program currently under execution by the computing device;
   in response to determining that operation of the program is to be changed:
      identifying a first processing resource of a plurality of processing resources of the computing device that is currently assigned to execute the program;
      selecting a second processing resource of the plurality of processing resources for subsequent execution of the program;
      ascertaining first execution settings of the program as used by the first processing resource;
      facilitating conversion of the first execution settings into second execution settings for the second processing resource; and
      de-assigning the first processing resource from executing the program and assigning the second processing resource to execute the program;
   in response to determining that operation of the program is to be changed again:
      identifying the second processing resource of the plurality of processing resources of the computing device that is currently assigned to execute the program;
      selecting a third processing resource of the plurality of processing resources for subsequent execution the program;
      ascertaining second execution settings of the program as used by the second processing resource;

facilitating conversion of the second execution settings into third execution settings for the third processing resource; and de-assigning the second processing resource from executing the program and assigning the third processing resource to execute the program; and repeatedly performing, over time, the change operation of a program to create different operational instructions for the program.

2. The method of claim 1, wherein the determining, based on the selected security request, to change operation of the program comprises at least one of:

utilizing a pseudo random sequence to identify, at pseudo random time intervals, the program from a plurality of programs;

determining when the program has been evoked a predetermined number of times or a pseudo random number of times;

determining that the program is operating outside of anticipated normal operating parameters; and receiving a command from a trusted management device.

3. The method of claim 1 further comprises:

the plurality of processing resources including a plurality of central processing units (CPUs) and a plurality of corresponding operating systems (OSs), wherein the first processing resource includes a first CPU of the plurality of CPUs and a first corresponding OS of the plurality of corresponding OSs and the second processing resource includes a second CPU of the plurality of CPUs and a second corresponding OS of the plurality of corresponding OSs; and the program including one of a plurality of user applications or one of a plurality of system applications.

4. The method of claim 1 further comprises:

the first processing resource including a first central processing unit (CPU) of a plurality of CPUs and a first operating system (OS) of a plurality of OSs;

the second processing resource includes at least one of a different CPU of the plurality of CPUs and a different OS of the plurality of OSs than the first processing resource, the different CPU and the different OS, in combination, changing the operation of the program; and the program including one of a plurality of user applications or one of a plurality of system applications.

5. The method of claim 1, wherein the selecting a second processing resource comprises at least one of:

utilizing a pseudo random sequence to select, at pseudo random time intervals, the second processing resource;

utilizing a process load distribution function to select the second processing resource;

determining that the first processing resource is operating outside of anticipated normal operating parameters; and receiving a command from a trusted management device.

6. The method of claim 1, wherein the ascertaining first execution settings of the program comprises at least one of:

ascertaining memory management information regarding the program as used by the first processing resource;

ascertaining file system information regarding the program as used by the first processing resource;

ascertaining process management information regarding the program as used by the first processing resource;

ascertaining security information regarding the program as used by the first processing resource; and ascertaining an instruction set type for the first processing resource.

7. The method of claim 1, wherein the facilitating conversion of the first execution settings into the second execution settings comprises at least one of:

determining a difference between memory management function of the first processing resource and the second processing resource and converting, based on the memory management difference, memory management information regarding execution of the program by the first processing resource into memory management information regarding execution of the program by the second processing resource;

determining a difference between file system management function of the first processing resource and the second processing resource and converting, based on the file system management difference, file system information regarding execution of the program by the first processing resource into file system information regarding execution of the program by the second processing resource;

determining a difference between process management function of the first processing resource and the second processing resource and converting, based on the process management difference, process management information regarding execution of the program by the first processing resource into process management information regarding execution of the program by the second processing resource;

determining a difference between security management function of the first processing resource and the second processing resource and converting, based on the security management difference, security information regarding execution of the program by the first processing resource into security information regarding execution of the program by the second processing resource; and determining an instruction set type of the second processing resource and converting, based on the instruction set type of the second processing resource, operational instructions of the program into machine language for a processor of the second processing resource.

8. The method of claim 1, wherein the determining to change operation of a program, based on a selected security request, comprises:

determining to change operation of a portion of the program, wherein the program includes:

an operating system (OS) that includes a plurality of OS functions, wherein each OS function includes one or more OS function sub-routines and wherein a portion of the OS includes one of the OS functions or the corresponding one or more OS function sub-routines;

a user application that includes a plurality of user application functions, wherein one of the user application functions includes one or more user application function sub-routines, wherein a portion of the user application includes the one of the user application functions or the one or more user application function sub-routines; and a system application that includes a plurality of system application functions, wherein one of the system application functions includes one or more system application function sub-routines, wherein a portion of the system application includes the one of the system application functions or the one or more system application function sub-routines.

9. A computing device comprises:

a plurality of central processing resources;

memory operably coupled to at least one of the plurality of central processing resources;
a network interface operably coupled to at least one of the plurality of central processing resources; and
a security control module operable to:
determine to change operation of a program of the computing device based on a selected security request; and
when operation of the program is to be changed:
identify a first processing resource of the plurality of central processing resources that is currently assigned to execute the program;
select a second processing resource of the plurality of central processing resources for subsequent execution the program;
ascertain first execution settings of the program as used by the first processing resource;
facilitate conversion of the first execution settings into second execution settings for the second processing resource; and
de-assign the first processing resource from executing the program and assign the second processing resource to execute the program; and
when operation of the program is to be changed again:
identify the second processing resource of the plurality of processing resources of the computing device that is currently assigned to execute the program;
select a third processing resource of the plurality of processing resources for subsequent execution the program;
ascertain second execution settings of the program as used by the second processing resource;
facilitate conversion of the second execution settings into third execution settings for the third processing resource; and
de-assign the second processing resource from executing the program and assigning the third processing resource to execute the program; and
repeatedly performing, over time, the change operation of a program to create different operational instructions for the program.

10. The computing device of claim 9, wherein the security control module is further operable to determine to change the program, based on the selected security request, by at least one of:
utilizing a pseudo random sequence to identify, at pseudo random time intervals, the program from a plurality of programs;
determining when the program has been evoked a predetermined number of times or a pseudo random number of times;
determining that the program is operating outside of anticipated normal operating parameters; and
receiving a command from a trusted management device.

11. The computing device of claim 9 further comprises:
the plurality of central processing resources including one or more of:
a plurality of processing modules;
a plurality of memory control units;
a plurality of input/output interface control units;
a plurality of peripheral control units; and
a plurality of video graphics processing units;
additional memory including one or more of:
a plurality of main memories; and
a plurality of external memories; and
the program including one of a plurality of user applications or one of a plurality of system applications.

12. The computing device of claim 9 further comprises:
the first processing resource including a first central processing unit (CPU) of a plurality of CPUs and a first operating system (OS) of a plurality of OSs;
the second processing resource includes at least one of a different CPU of the plurality of CPUs and a different OS of the plurality of OSs than the first processing resource; and
the program including one of a plurality of user applications or one of a plurality of system applications.

13. The computing device of claim 9, wherein the security control module is further operable to select the second processing resource by at least one of:
utilizing a pseudo random sequence to select, at pseudo random time intervals, the second processing resource;
utilizing a process load distribution function to select the second processing resource;
determining that the first processing resource is operating outside of anticipated normal operating parameters; and
receiving a command from a trusted management device.

14. The computing device of claim 9, wherein the security control module is further operable to ascertain the first execution settings of the program by at least one of:
ascertaining memory management information regarding the program as used by the first processing resource;
ascertaining file system information regarding the program as used by the first processing resource;
ascertaining process management information regarding the program as used by the first processing resource;
ascertaining security information regarding the program as used by the first processing resource; and
ascertaining an instruction set type for the first processing resource.

15. The computing device of claim 9, wherein the security control module is further operable to facilitate conversion of the first execution settings into the second execution settings by at least one of:
determining a difference between memory management function of the first processing resource and the second processing resource and converting, based on the memory management difference, memory management information regarding execution of the program by the first processing resource into memory management information regarding execution of the program by the second processing resource;
determining a difference between file system management function of the first processing resource and the second processing resource and converting, based on the file system management difference, file system information regarding execution of the program by the first processing resource into file system information regarding execution of the program by the second processing resource;
determining a difference between process management function of the first processing resource and the second processing resource and converting, based on the process management difference, process management information regarding execution of the program by the first processing resource into process management information regarding execution of the program by the second processing resource;
determining a difference between security management function of the first processing resource and the second processing resource and converting, based on the security management difference, security information regarding execution of the program by the first processing resource into security information regarding execution of the program by the second processing resource; and determining an instruction set type of the second processing resource and converting, based on the instruction set type of the second processing resource, operational instructions of the program into machine language for a processor of the second processing resource.

16. The computing device of claim 9, wherein the security control module is further operable to determine to change operation of a program by:

determining to change operation of a portion of the program, wherein the program includes:

an operating system (OS) that includes a plurality of OS functions, wherein each OS function includes one or more OS function sub-routines and wherein a portion of the OS includes one of the OS functions or the corresponding one or more OS function sub-routines;

a user application that includes a plurality of user application functions, wherein one of the user application functions includes one or more user application function sub-routines, wherein a portion of the user application includes the one of the user application functions or the one or more user application function sub-routines; and a system application that includes a plurality of system application functions, wherein one of the system application functions includes one or more system application function sub-routines, wherein a portion of the system application includes the one of the system application functions or the one or more system application function sub-routines.

17. A method for execution by a security control module to reduce adverse impact of malicious software in a computing device, the method comprises:

determining, based on a selected security request, whether to repeatedly change, over time, an operation of a program currently under execution by the computing device; and in response to determining that operation of the program is to be changed:

identifying a first processing resource of a plurality of processing resources of the computing device that is currently assigned to execute the program;

selecting a second processing resource of the plurality of processing resources for subsequent execution the program;

ascertaining first execution settings of the program as used by the first processing resource;

facilitating conversion of the first execution settings into second execution settings for the second processing resource; and de-assigning the first processing resource from executing the program and assigning the second processing resource to execute the program; and wherein the repeatedly changing, over time, an operation of a program currently under execution by the computing device creates different operational instructions for the program.

18. The method of claim 17, wherein the determining, based on a selected security request, to repeatedly change over time an operation of a program currently under execution by the computing device comprises at least one of:

utilizing a pseudo random sequence to identify, at pseudo random time intervals, the program from a plurality of programs;

determining when the program has been evoked a predetermined number of times or a pseudo random number of times;

determining that the program is operating outside of anticipated normal operating parameters; and receiving a command from a trusted management device.

19. The method of claim 17 further comprises:

the first processing resource including a first central processing unit (CPU) of a plurality of CPUs and a first operating system (OS) of a plurality of OSs;

the second processing resource includes at least one of a different CPU of the plurality of CPUs and a different OS of the plurality of OSs than the first processing resource, the different corresponding OS changing the operation of the program, the different CPU and the different OS, in combination, changing the operation of the program; and the program including one of a plurality of user applications or one of a plurality of system applications.

20. The method of claim 17 further comprising: ascertaining the first execution settings of the program by at least one of:

ascertaining memory management information regarding the program as used by the first processing resource;

ascertaining file system information regarding the program as used by the first processing resource;

ascertaining process management information regarding the program as used by the first processing resource;

ascertaining security information regarding the program as used by the first processing resource; and ascertaining an instruction set type for the first processing resource.

* * * * *